(12) United States Patent
Suh et al.

(10) Patent No.: US 12,302,432 B2
(45) Date of Patent: May 13, 2025

(54) METHOD AND APPARATUS FOR MANAGING SESSION IN WIRELESS COMMUNICATION SYSTEM

(71) Applicant: SAMSUNG ELECTRONICS CO., LTD., Suwon-si (KR)

(72) Inventors: Kyungjoo Suh, Suwon-si (KR); Kisuk Kweon, Suwon-si (KR); Jungshin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 271 days.

(21) Appl. No.: 17/758,449

(22) PCT Filed: Jan. 5, 2021

(86) PCT No.: PCT/KR2021/000081
§ 371 (c)(1),
(2) Date: Jul. 6, 2022

(87) PCT Pub. No.: WO2021/141358
PCT Pub. Date: Jul. 15, 2021

(65) Prior Publication Data
US 2023/0039877 A1    Feb. 9, 2023

(30) Foreign Application Priority Data

Jan. 6, 2020 (KR) .......... 10-2020-0001572
Jan. 6, 2020 (KR) .......... 10-2020-0001643

(51) Int. Cl.
*H04W 76/18* (2018.01)
*H04W 80/10* (2009.01)

(52) U.S. Cl.
CPC .......... *H04W 76/18* (2018.02); *H04W 80/10* (2013.01)

(58) Field of Classification Search
CPC ..... H04W 12/06; H04W 76/12; H04W 76/18; H04W 80/02
See application file for complete search history.

(56) References Cited

U.S. PATENT DOCUMENTS 10,177,933 B2    1/2019  Burks et al.
2019/0254089 A1  8/2019  Huang-Fu et al.
(Continued)

FOREIGN PATENT DOCUMENTS

EP    3694254 A1 *  8/2020  ............ H04W 36/00
KR    10-2019-0116894 A    10/2019
(Continued)

OTHER PUBLICATIONS

European Patent Office, "Supplementary European Search Report," dated May 22, 2023, in connection with European Patent Application No. 21738649.9, 17 pages.
(Continued)

*Primary Examiner* — Zhensheng Zhang

(57) ABSTRACT

The present disclosure relates to a method and apparatus for allowing a user equipment (UE) to manage a session in a wireless communication system. According to an embodiment of the present disclosure, the UE may transmit a first uplink (UL) non-access stratum (NAS) transport message including a packet data unit (PDU) session establishment request to an access and mobility management function (AMF), receive a downlink (DL) NAS transport message from the AMF, and transmit a second UL NAS transport message including the PDU session establishment request based on a timer.

9 Claims, 17 Drawing Sheets

(56) References Cited

U.S. PATENT DOCUMENTS

2019/0274177 A1    9/2019  Kuge et al.
2020/0336937 A1   10/2020  Youn et al.
2021/0037380 A1    2/2021  Lee et al.
2023/0370844 A1*  11/2023  Zhu .................. H04W 28/0289

FOREIGN PATENT DOCUMENTS

WO       2019074347 A1    4/2019
WO       2019/135560 A1   7/2019

OTHER PUBLICATIONS

3GPP TS 24.501 V16.3.0 (Dec. 2019); 3rd Generation Partnership Project; Technical Specification Group Core Network and Terminals; Non-Access-Stratum (NAS) protocol for 5G System (5GS); Stage 3 (Release 16); 645 pages.

International Search Report and Written Opinion of the International Searching Authority in connection with International Application No. PCT/KR2021/000081 issued Apr. 14, 2021, 13 pages.

Qualcomm Incorporated, "Handling of user-plane resources for NB-IoT UEs having at least two PDU sessions", C1-198585, 3GPP TSG-CT WG1 Meeting #121, Reno (NV), USA, Nov. 11-15, 2019, 13 pages.

Nokia et al., "Corrections for MA PDU session handling", S2-1912135, SA WG2 Meeting #136, Reno, Nevada, USA, Nov. 18-22, 2019, 10 pages.

Notice of Allowance dated Mar. 19, 2025, in connection with European Application No. 21738649.9, 62 pages.

\* cited by examiner

FIG. 4

| 8 | 7 | 6 | 5 | 4 | 3 | 2 | 1 | |
|---|---|---|---|---|---|---|---|---|
| Multiple SM error cause IEI ||||||||octet 1 |
| Length of multiple SM error cause ||||||||octet 2 |
| ||||||||octet 3 |
| PDU session ID ||||||||octet 4 |
| cause value ||||||||octet 5 |
| . . . . ||||||||  |
| PDU session ID ||||||||octet 514* |
| cause value ||||||||octet 515* |

FIG. 5

| 8 | 7 | 6 | 5 | 4 | 3 | 2 | 1 | |
|---|---|---|---|---|---|---|---|---|
| colspan="8" | Multiple SM error cause with backoff timer IEI | | | | | | | octet 1 |
| colspan="8" | Length of multiple SM error cause | | | | | | | octet 2 |
| | | | | | | | | octet 3 |
| colspan="8" | PDU session ID | | | | | | | octet 4 |
| colspan="8" | cause value | | | | | | | octet 5 |
| colspan="3" | Unit | | | colspan="5" | Timer value | | | | |
| | . . . . | | | | | | | |
| colspan="8" | PDU session ID | | | | | | | octet n |
| colspan="8" | cause value | | | | | | | octet n+1 |
| colspan="3" | Unit | | | colspan="5" | Timer value | | | | |

METHOD AND APPARATUS FOR MANAGING SESSION IN WIRELESS COMMUNICATION SYSTEM

CROSS-REFERENCE TO RELATED APPLICATIONS

This application is a 371 of International Application No. PCT/KR2021/000081, filed Jan. 5, 2021, which claims priority to Korean Patent Application No. 10-2020-0001643, filed Jan. 6, 2020, and Korean Patent Application No. 10-2020-0001572 filed on Jan. 6, 2020, the disclosures of which are herein incorporated by reference in their entirety.

BACKGROUND

1. Field

The present disclosure relates to a method and apparatus for managing a session in a wireless communication system, and more particularly, to an apparatus and method for managing a session when a network entity for managing mobility and a network entity for managing a session are separated from each other. In addition, the present disclosure relates to a technique for performing authentication of a session in a wireless communication system, and more particularly, to a method and apparatus for performing authentication of a session by using a non-access stratum (NAS) message.

2. Description of Related Art

To meet the demand for wireless data traffic having increased since deployment of 4th Generation (4G) communication systems, efforts have been made to develop a 5th Generation (5G) or pre-5G communication system. For this reason, 5G or pre-5G communication system is also called 'Beyond 4G Network' or 'Post Long-Term Evolution (LTE) System'.

The 5G communication system defined by 3rd Generation Partnership Project (3GPP) is called an New Radio (NR) system. The 5G communication system is considered to be implemented in ultra-high frequency (millimeter (mm) Wave) bands, (e.g., 60 gigahertz (GHz) bands), so as to accomplish higher data rates, and in order to mitigate path loss of radio waves and increase a propagation distance of radio waves in an ultra-high frequency band, beamforming, massive multiple-input and multiple-output (MIMO), full-dimensional MIMO (FD-MIMO), array antenna, analog beamforming, and large-scale antenna technologies are applied to radio wave transmission and reception.

Also, in order to improve a network of a 5G communication system, technologies such as evolved small cells, advanced small cells, cloud radio access networks (cloud RANs), ultra-dense networks, device-to-device (D2D) communication, wireless backhaul, moving networks, cooperative communication, Coordinated Multi-Points (CoMP), and received-interference cancelation, have been developed. In addition, for 5G communication systems, hybrid frequency shift keying (FSK) and quadrature amplitude modulation (QAM) (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced access technologies, have been developed.

As described above, various technologies are now providable with the development of wireless communication systems, there is a need for a method of efficiently managing a wireless communication system by using such various technologies. The present disclosure relates to a method for managing a session when a network entity for managing mobility and a network entity for managing a session are separated from each other in a wireless communication system.

SUMMARY

The present disclosure may provide an apparatus and method for managing a session in a wireless communication system in which a network entity for managing mobility and a network entity for managing a session are separated from each other, when a message for session management fails to be forwarded. In addition, the present disclosure may provide a method and apparatus for processing a non-access stratum (NAS) for release, establishment, and modification of a session when session authentication fails in a wireless communication system.

The present disclosure relates to a method and apparatus for allowing a user equipment (UE) to manage a session in a wireless communication system. According to an embodiment of the present disclosure, a UE may transmit a first uplink (UL) non-access stratum (NAS) transport message including a packet data unit (PDU) session establishment request to an access and mobility management function (AMF), receive a downlink (DL) NAS transport message from the AMF, and transmit a second UL NAS transport message including the PDU session establishment request based on a timer.

According to one embodiment of the present disclosure, in the case in which a network entity for managing mobility and a network entity for managing a session are separated from each other in a wireless communication system, various services may be efficiently supported when performing session management, by forwarding a session-related message. In addition, according to an embodiment of the present disclosure, various services may be efficiently supported by performing authentication of a session in a wireless communication system.

BRIEF DESCRIPTION OF THE DRAWINGS

FIG. 4 is a diagram for describing cause information included in a DL NAS TRANSPORT message, according to an embodiment of the present disclosure.

FIG. 5 is a diagram for describing cause information included in a DL NAS TRANSPORT message, according to another embodiment of the present disclosure.

DETAILED DESCRIPTION

Figure 1:
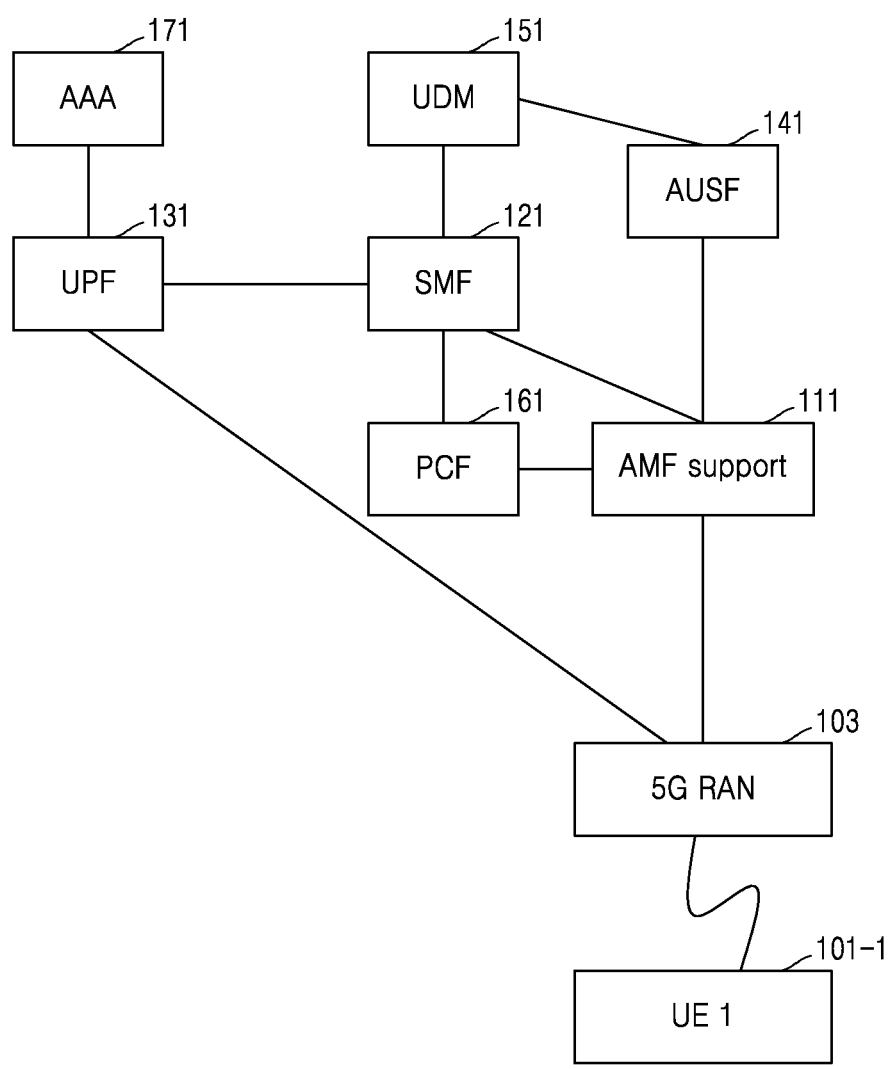
FIG. 1 is a diagram for describing a structure of a wireless communication system according to an embodiment of the present disclosure.

According to an embodiment of the present disclosure, a method, performed by a user equipment (UE), of managing a session in a wireless communication system may include: transmitting, to an access and mobility management function (AMF), a first uplink (UL) non-access stratum (NAS) transport message including a packet data unit (PDU) session establishment request; receiving a downlink (DL) NAS transport message from the AMF; and transmitting, based on a back-off timer included in the UL NAS transport message, a second DL NAS transport message including a PDU session establishment re-request.

According to an embodiment of the present disclosure, a method, performed by an AMF, of managing a session in a wireless communication system may include: receiving, from a UE, a first UL NAS transport message including a PDU session establishment request; determining whether the PDU session establishment request is forwardable to a session management function (SMF); transmitting, to the UE, a DL NAS transport message including a back-off timer that is set based on whether the forwarding is successful; and receiving, from the UE, a second DL NAS transport message including a PDU session establishment re-request, based on the back-off timer included in the UL NAS transport message.

According to an embodiment of the present disclosure, a UE for managing a session in a wireless communication system may include: a transceiver; and at least one processor coupled with the transceiver, wherein the at least one processor is configured to control the transceiver to transmit, to an AMF, a first UL NAS transport message including a PDU session establishment request, receive a DL NAS transport message from the AMF, and transmit, based on a back-off timer included in the UL NAS transport message, a second DL NAS transport message including a PDU session establishment re-request.

According to an embodiment of the present disclosure, a network entity for managing a session in a wireless communication system may include: a transceiver; and at least one processor coupled with the transceiver, wherein the at least one processor is configured to control the transceiver to receive a first UL NAS transport message including a PDU session establishment request from a UE, determine whether the PDU session establishment request is forwardable to an SMF, and control the transceiver to transmit, to the UE, a DL NAS transport message including a back-off timer that is set based on whether the forwarding is successful and receive a second DL NAS transport message including a PDU session establishment re-request from the UE, based on the back-off timer included in the UL NAS transport message.

According to an embodiment of the present disclosure, a method, performed by a UE, of authenticating a session in a wireless communication system may include: transmitting a PDU session authentication complete message to an SMF; receiving a PDU session establishment reject or PDU session release message from the SMF as it is determined that authentication of the PDU session has failed; and determining to re-request PDU session establishment based on a value of a back-off timer included in the message received from the SMF.

According to an embodiment of the present disclosure, a method, performed by an SMF, of authenticating a session in a wireless communication system may include: receiving, from a UE, a PDU session authentication complete message; and transmitting, to the UE, a PDU session establishment reject or PDU session release message as it is determined that authentication of the PDU session have failed, wherein retransmission of a PDU session establishment request message may be performed based on a value of a back-off timer included in the PDU session establishment reject message.

According to an embodiment of the present disclosure, a UE for performing authentication of a session in a wireless communication system may include: a transceiver; and at least one processor coupled with the transceiver, wherein the at least one processor is configured to control the transceiver to transmit a PDU session authentication complete message to an SMF and receive a PDU session establishment reject or session release message from the SMF as it is determined that authentication of the PDU session has failed, and determine retransmission of a PDU session establishment request based on a value of a back-off timer included in the message received from the SMF.

According to an embodiment of the present disclosure, a network entity for performing authentication of a session in a wireless communication system may include: a transceiver; and at least one processor coupled with the transceiver, wherein the at least one processor is configured to control the transceiver to receive, from a UE, a PDU session authentication complete message, and control the transceiver to transmit, to the UE, a PDU session establishment reject or a PDU session release message as it is determined that authentication of the PDU session has failed, wherein retransmission of a PDU session establishment request may be determined according to a value of a back-off timer included in the PDU session establishment reject or the PDU session release message.

Hereinafter, embodiments of the present disclosure are described in detail with reference to the accompanying drawings. In the description of embodiments, technical features that are well known to the technical field to which the present disclosure belongs but are not directly associated with the present disclosure are not described. This is not to obscure but to clearly deliver the gist of the present disclosure by omitting an unnecessary description.

For the same reason, in the accompanying drawings, some elements are exaggerated, omitted, or schematically shown. In addition, sizes of elements do not fully reflect actual sizes thereof. Like reference numbers are used to refer to like elements through at the drawings.

Advantages and features of the present disclosure and a method for achieving them will be apparent with reference to embodiments of the present disclosure described below together with the attached drawings. The present disclosure may, however, be embodied in many different forms and should not be construed as being limited to the embodiments set forth herein, rather, these embodiments are provided such that the present disclosure will be thorough and complete, and will fully convey the concept of the present disclosure to those of ordinary skill in the art, and the present disclosure will be defined only by the concept of the claims. Like reference numerals denote like elements throughout the specification.

Here, it could be understood that each block in processing flowchart drawings and combinations of flowchart drawings may be performed by computer program instructions.

In addition, each block may indicate a portion of a module, a segment, or a code including one or more executable instructions for executing particular logical function(s). Also, in several substitutional embodiments, functions described in blocks may also be out of a sequence. For example, two consecutively shown blocks may be substantially performed at the same time in fact, or the blocks may be sometimes performed in a reverse order according to a corresponding function.

The term '. . . unit' used in the embodiments indicates a component including software or hardware, such as a field-programmable gate array (FPGA) or an application-specific integrated circuit (ASIC), and the '. . . unit' performs certain roles. However, the '. . . unit' does not always have a meaning limited to software or hardware. The '. . . unit' may be configured either to be stored in an addressable storage medium or to execute one or more processors. Therefore, for example, the '. . . unit' includes components, such as software components, object-oriented software components, class components, and task components, processes, functions, attributes, procedures, subroutines, segments of program code, drivers, firmware, microcode, circuits, data, a database, data structures, tables, arrays, and variables. A function provided inside components and '. . . units' may be combined into a smaller number of components and '. . . units' or be further divided into additional components and '. . . units'. In addition, components and '. . . units' may be implemented to reproduce one or more central processing units (CPUs) inside a device or a security multimedia card. Also, in an embodiment, the '. . . unit' may include one or more processors.

Terms referring to access nodes, terms referring to network entities or network functions, terms referring to messages, terms referring to interfaces between network entities, terms referring to a variety of identification information, and the like are exemplified for convenience of description. Accordingly, the present disclosure is not limited to the terms used herein, and may use other terms having technically identical meaning.

In the following description, the present disclosure will be described with terms and names defined in the 3rd Generation Partnership Project (3GPP) Long-Term Evolution (LTE) standards, or terms and names modified therefrom, for the convenience of description. However, the present disclosure is not limited by these terms and names, and may be applied in the same way to systems that conform other standards. In the present disclosure, for convenience of descriptions, the terms 'eNB' and 'gNB' may be interchangeably used. That is, a base station mentioned as an eNB may refer to a gNB. In the present disclosure, the term 'terminal' may represent various wireless communication devices, as well as cellular phones, narrowband internet-of-Things (NB-IoT) devices, and sensors.

That is, in describing the embodiments of the present disclosure in detail, the main focus is placed on the communication standards defined by the 3GPP, but it will be understood by those skilled in the art that the gist of the present disclosure is applicable to other communication systems having similar technical backgrounds without significant modifications departing from the scope of the present disclosure.

In a 5th Generation (5G) or New Radio (NR) system, an access and mobility management function (AMF), which is a management entity for managing mobility of a terminal, and a session management function (SMF), which is an entity for managing a session, are separated from each other. Unlike in a 4th Generation (4G) LTE communication system in which a mobility management entity (MME) performs both mobility management and session management, an entity that performs mobility management and an entity that performs session management are separated from each other in a 5G or NR system, and thus a method of performing communication between a terminal and a network entity and a method of managing such communication may be changed.

In a 5G or NR system, when a terminal accesses a network through non-3GPP access, mobility management may be performed by an AMF through a non-3GPP inter-working function (N3IWF), and session management may be performed by an SMF. In addition, the AMF may process security-related information, which is an important element in mobility management.

As described above, in a 4G LTE system, an MME performs both mobility management and session management. In a 5G or NR system, a non-standalone architecture that performs communication by using network entities of such a 4G LTE system together may be supported.

An embodiment of the present disclosure is to solve an issue that may occur when a session-related message is not forwarded in transmission of a packet data unit (PDU) session establishment message from a user equipment (UE) to an SMF, and a session management message is not transmitted to the UE and a network in transmission of a downlink (DL) non-access stratum (NAS) transport message from an AMF to the UE.

According to an embodiment of the present disclosure, provided are a method and apparatus for seamlessly performing session management by defining a session management message transmission-related operation and a mobility-related operation to be performed by a UE and a network when the UE has attempted to transmit a PDU session establishment message to an SMF but the PDU session establishment message has failed to be forwarded, and a DL NAS transport message is transmitted from the AMF to the UE.

According to an embodiment of the present disclosure, operations may be defined to be performed by a UE and a network when authentication of a PDU session has failed and thus the network rejects or releases the PDU session, such that the operations of the UE and the network are synchronized according to whether authentication of a PDU session succeeds or fails, and thus communication is efficiently performed.

FIG. 1 is a diagram for describing a structure of a wireless communication system according to an embodiment of the present disclosure.

Referring to FIG. 1, a core network of the wireless communication system according to an embodiment may include network functions (NFs), such as a user plane function (UPF) 131, an SMF 121, an AMF 111, a 5G radio access network (RAN) 103, user data management (UDM) 151, and a policy control function (PCF) 161.

In addition, for authentication of entities corresponding to the respective NFs, entities such as an authentication server function (AUSF) 141, authentication, authorization and accounting (AAA) 171, and the like may be included in the wireless communication system.

Hereinafter, a session management method will be described on the assumption that the wireless communication system is a 5G communication system, but this is merely an example, and the session management method according to the present disclosure is also applicable to other communication systems.

A UE (or a terminal) 101-1 may access a 5G core network through a base station (e.g., a 5G RAN, a radio access network) 103, when performing communication through 3GPP access. Meanwhile, when the UE 101-1 performs communication through non-3GPP access, an N3IWF may exist, session management may be controlled through the UE, the non-3GPP access, the N3IWF, and an SMF, and mobility management may be controlled through the UE, the non-3GPP access, the N3IWF, and the AMF.

In a 5G or NR system, an entity that performs mobility management and session management is divided into the AMF 111 and the SMF 121. Meanwhile, a 5G or NR system may support a stand-alone deployment structure for performing communication only with 5G or NR entities, and a non-stand-alone deployment structure using both 4G entities and 5G or NR entities.

Figure 2A:
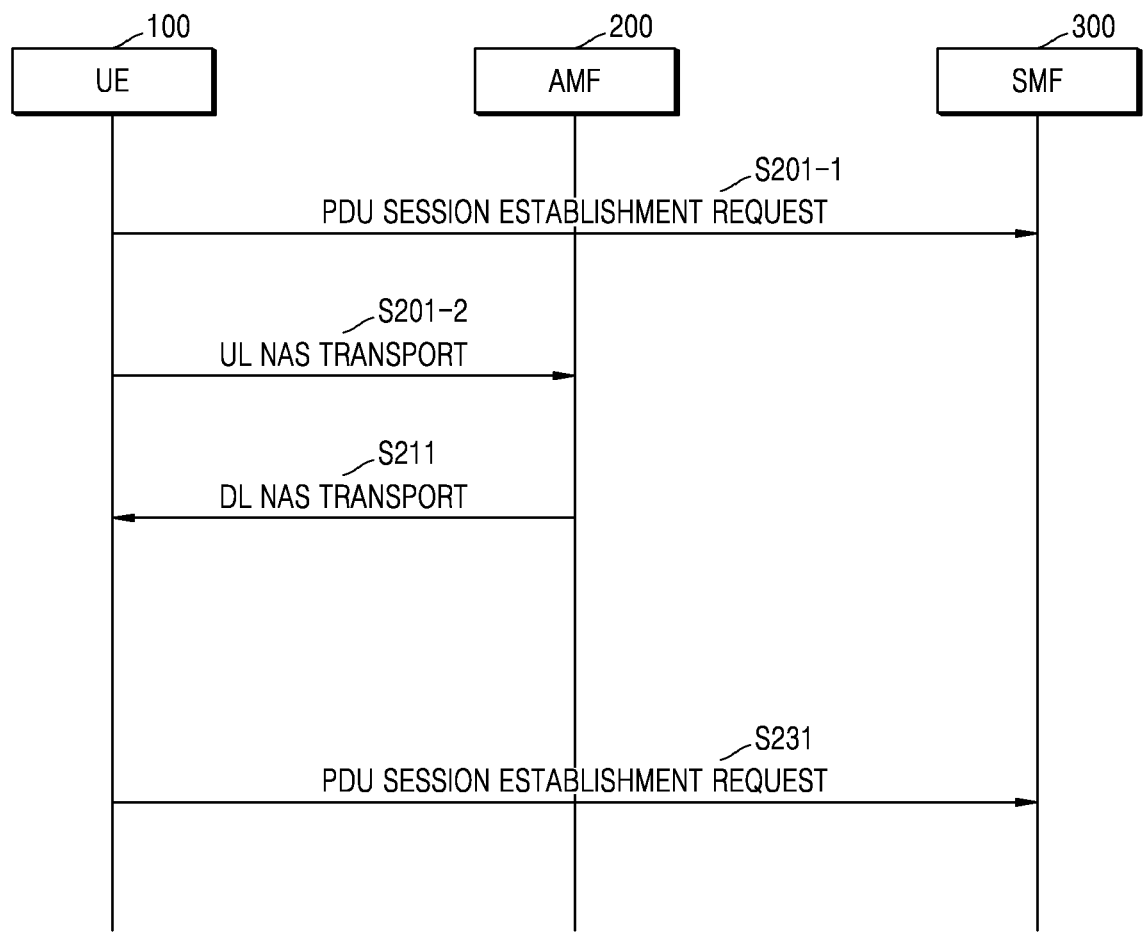
FIG. 2A is a flowchart for describing a method of performing session management by using a non-access stratum (NAS) message in a 5th Generation (5G) network environment, according to an embodiment of the present disclosure.

FIG. 2A is a flowchart for describing a method of performing session management by using a NAS message in a 5G network environment, according to an embodiment of the present disclosure.

In operation 201-1, a UE 100 may transmit a PDU SESSION ESTABLISHMENT REQUEST message to an SMF 300. The PDU SESSION ESTABLISHMENT REQUEST message of operation 201-1 passing through a section between the UE 100 and an AMF 200 is carried in an uplink (UL) NAS TRANSPORT message as in operation 201-2. (may be included therein and transmitted)

At this time, the PDU SESSION ESTABLISHMENT REQUEST message may be carried (included) in the UL NAS TRANSPORT message and transmitted from the UE 100 to the AMF 200 as in operation 201-2, but may then fail to be forwarded to the SMF 300 for various reasons, for example, because the AMF 200 is unable to find an appropriate SMF.

In this case, as in operation 211, the AMF 200 according to an embodiment transmits a DL NAS TRANSPORT message to the UE 100 to notify that the corresponding message has failed to be forwarded.

In operation 201-2, the UE 100 may transmit the UL NAS TRANSPORT message to the AMF 200.

In operation 211, the AMF 200 may transmit the DL NAS TRANSPORT message to the UE 100. According to an embodiment, the AMF 200 may set a timer in the DL NAS TRANSPORT message to be transmitted to the UE 100. The set timer may be a back-off timer that expires at a time point at which the PDU SESSION ESTABLISHMENT REQUEST message is retransmitted.

TABLE 1

| | | DL NAS TRANSPORT message | | | |
|---|---|---|---|---|---|
| IEI | Information Element | Type/Reference | Presence | Format | Length |
| | Extended protocol discriminator | Extended protocol discriminator 9.2 | M | V | 1 |
| | Security header type | Security header type 9.3 | M | V | ½ |
| | Spare half octet | Spare half octet 9.5 | M | V | ½ |
| | DL NAS TRANSPORT message identity | Message type 9.7 | M | V | 1 |
| | Payload container type | Payload container type 9.11.3.40 | M | V | ½ |
| | Spare half octet | Spare half octet 9.5 | M | V | ½ |
| | Payload container | Payload container 9.11.3.39 | M | LV-E | 3-65537 |
| 12 | PDU session ID | PDU session identity 2 9.11.3.41 | C | TV | 2 |
| 24 | Additional information | Additional information 9.11.2.1 | O | TLV | 3-n |
| 58 | 5GMM cause | 5GMM cause 9.11.3.2 | O | TV | 2 |
| 37 | Back-off timer value | GPRS timer 3 9.11.2.5 | O | TLV | 3 |

The UE 100 having received the DL NAS TRANSPORT message may back off until the back-off timer expires.

Thereafter, when the back-off timer expires, the UE 100 may retransmit the PDU SESSION ESTABLISHMENT REQUEST message to the SW' 300 in operation 231. The UE 100 may transmit the PDU SESSION ESTABLISHMENT REQUEST message to retry to establish the PDU session.

Figure 2B:
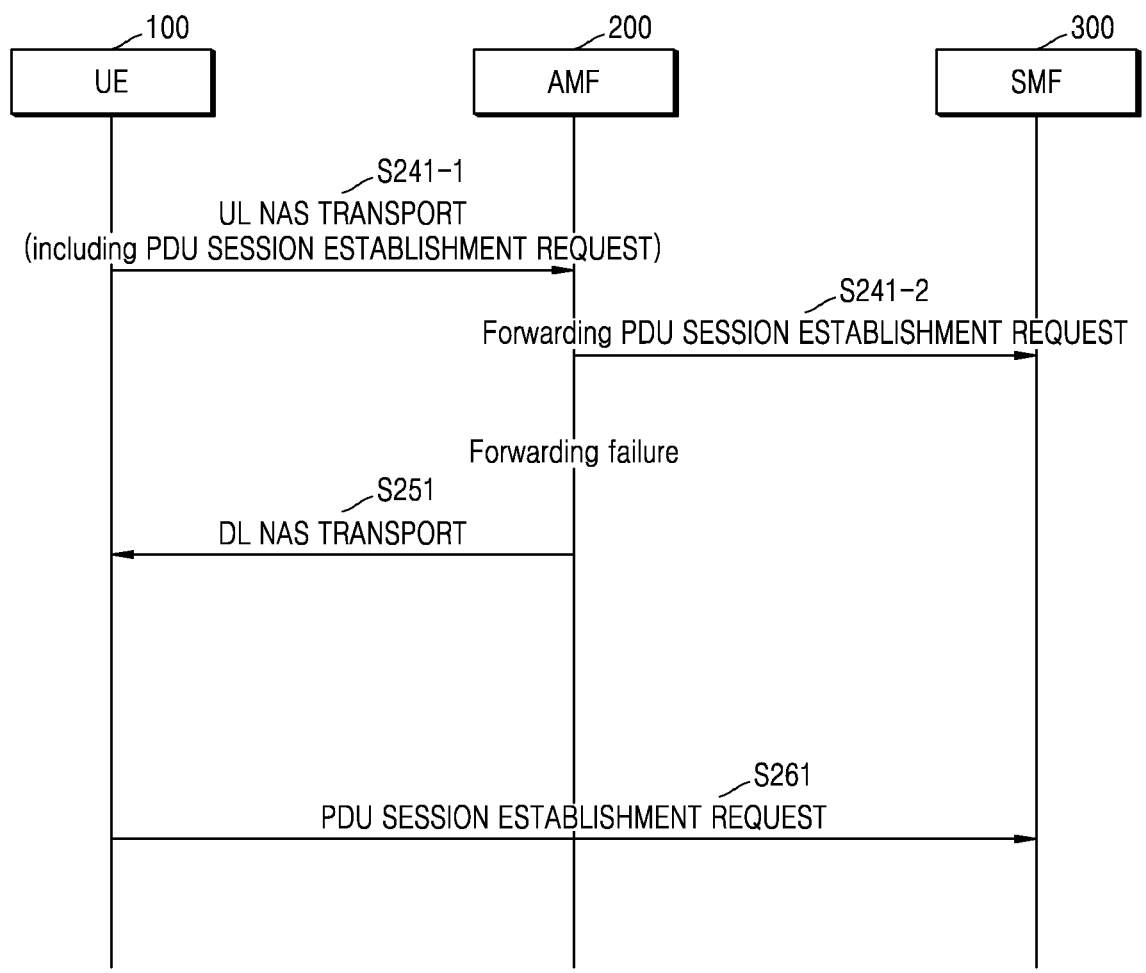
FIG. 2B is a flowchart for describing in more detail a method of performing session management by using a NAS message in a 5G network environment, according to an embodiment of the present disclosure.

FIG. 2B is a flowchart for describing in more detail a method of performing session management by using a NAS message in a 5G network environment, according to an embodiment of the present disclosure.

In operation 241-1, the UE 100 may transmit a UL NAS TRANSPORT message including a PDU SESSION ESTABLISHMENT REQUEST message to the AMF 200.

In operation 241-2, the AMF 200 needs to forward the PDU SESSION ESTABLISHMENT REQUEST message to the SMF 300, but the PDU SESSION ESTABLISHMENT REQUEST message may fail to be forwarded to the SMF 300 for various reasons, for example, because the AMF 200 is unable to find an appropriate SMF. In such a case in which the forwarding fails, operation 241-2 is not performed.

In operation 251, the AMF 200 may transmit a DL NAS TRANSPORT message to the UE 100 as the forwarding of the PDU SESSION ESTABLISHMENT REQUEST message has failed. The AMF 200 may transmit the DL NAS TRANSPORT message to inform the UE 100 that the PDU SESSION ESTABLISHMENT REQUEST message has not been forwarded.

In addition, the AMF 200 according to an embodiment may set a timer in the DL NAS TRANSPORT message to be transmitted to the UE 100. The set timer may be a back-off timer that expires at a time point at which the PDU SESSION ESTABLISHMENT REQUEST message is transmitted again (retransmitted).

The UE 100 having received the DL NAS TRANSPORT message may back off until the back-off timer expires.

In operation 261, as the back-off timer expires, the UE 100 may retry to establish the PDU session by retransmitting the PDU SESSION ESTABLISHMENT REQUEST message to the SMF 300 through the AMF 200.

Figure 3A:
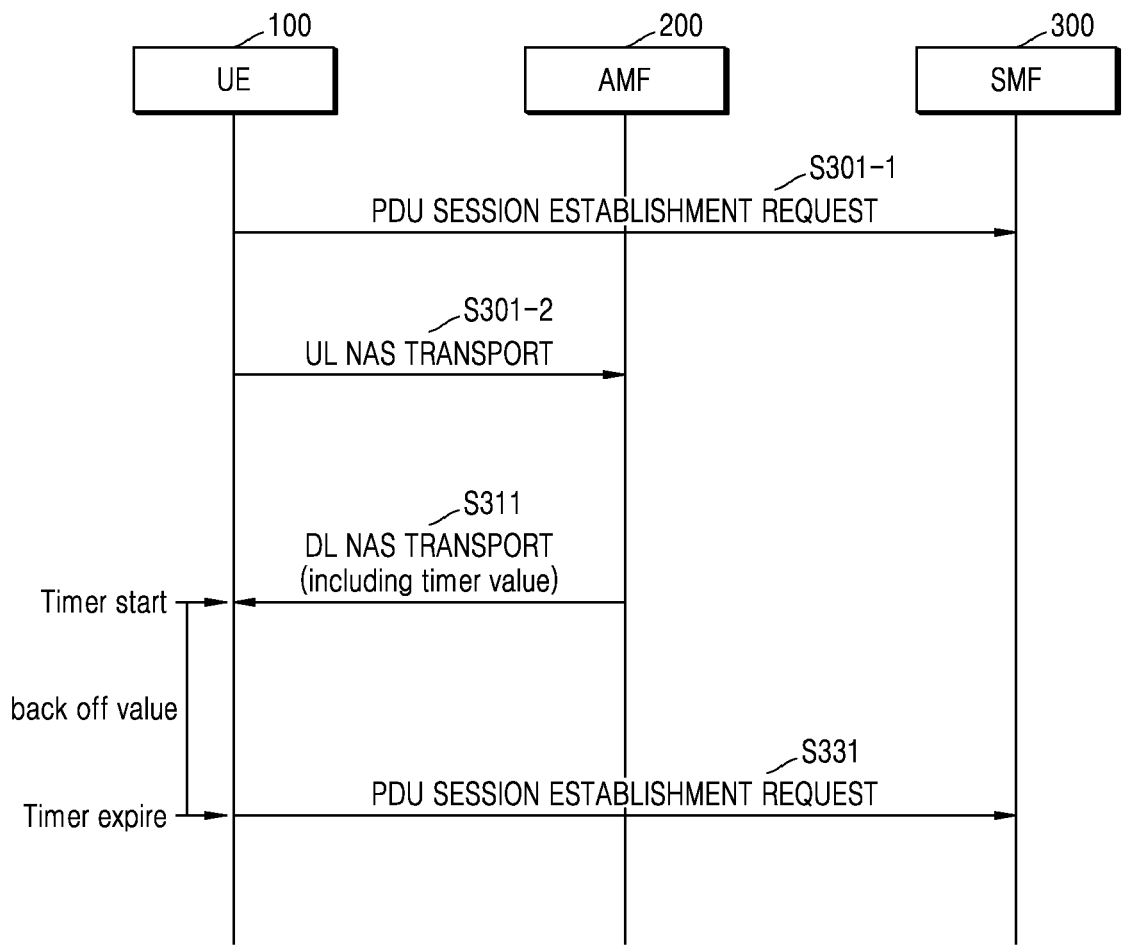
FIG. 3A is a flowchart for describing a method of performing session management based on a back-off timer value included in a NAS message in a 5G network environment, according to an embodiment of the present disclosure.

FIG. 3A is a flowchart for describing a method of performing session management based on a back-off timer value included in a NAS message in a 5G network environment, according to an embodiment of the present disclosure.

In operation 301-1, the UE 100 may transmit a PDU SESSION ESTABLISHMENT REQUEST message to the SMF 300. The PDU SESSION ESTABLISHMENT REQUEST message of operation 301-1 passing through a section between the UE 100 and the AMF 200 is carried in a UL NAS TRANSPORT message as in operation 301-2 (may be included therein and transmitted).

At this time, the PDU SESSION ESTABLISHMENT REQUEST message may be carried (included) in the UL NAS TRANSPORT message and transmitted from the UE 100 to the AMF 200 as in operation 201-2, but may then fail to be forwarded to the SMF 300 for various reasons, for example, because the AMF 200 is unable to find an appropriate SMF.

In this case, as in operation 311, the AMF 200 according to an embodiment transmits a DL NAS TRANSPORT message to the UE 100 to notify that the corresponding message has failed to be forwarded.

In operation 301-2, the UE 100 may transmit the UL NAS TRANSPORT message to the AMF 200.

In operation 311, the AMF 200 may transmit the DL NAS TRANSPORT message to the UE 100. According to an embodiment, the AMF 200 may set a timer in the DL NAS TRANSPORT message to be transmitted to the UE 100. The set timer may be a back-off timer that expires at a time point at which the PDU SESSION ESTABLISHMENT REQUEST message is transmitted again (retransmitted).

As shown in Table 2 or 3 below, the DL NAS TRANSPORT message may include a back-off timer for setting a time point at which the PDU SESSION ESTABLISHMENT REQUEST message is to be retransmitted.

In addition, when a multiple-session management message is not transmitted or some of session management messages are not transmitted, the DL NAS TRANSPORT message may include cause information in order to inform of a cause of the untransmitted message(s). Such cause information may be coded with a single information element 'Multiple SM cause' as illustrated in FIG. 4. According to another embodiment, the cause information may be coded together with a back-off timer as illustrated in FIG. 5 and coded into multiple SM cause with back-off timer value as shown in Table 3.

TABLE 2

| | DL NAS TRANSPORT message | | | | |
|---|---|---|---|---|---|
| IEI | Information Element | Type/Reference | Presence | Format | Length |
| | Extended protocol discriminator | Extended protocol discriminator 9.2 | M | V | 1 |
| | Security header type | Security header type 9.3 | M | V | ½ |
| | Spare half octet | Spare half octet 9.5 | M | V | ½ |
| | DL NAS TRANSPORT message identity | Message type 9.7 | M | V | 1 |
| | Payload container type | Payload container type 9.11.3.40 | M | V | ½ |
| | Spare half octet | Spare half octet 9.5 | M | V | ½ |
| | Payload container | Payload container 9.11.3.39 | M | LV-E | 3-65537 |
| 12 | PDU session ID | PDU session identity 2 9.11.3.41 | C | TV | 2 |
| 24 | Additional information | Additional information 9.11.2 1 | O | TLV | 3-n |
| 58 | 5GMM cause | 5GMM cause 9.11.3.2 | O | TV | 2 |
| 37 | Back-off timer value multiple SM cause | GPRS timer 3 9.11.2.5 | O | TLV | 3 |

TABLE 3

| | DL NAS TRANSPORT message | | | | |
|---|---|---|---|---|---|
| IEI | Information Element | Type/Reference | Presence | Format | Length |
| | Extended protocol discriminator | Extended protocol discriminator 9.2 | M | V | 1 |
| | Security header type | Security header type 9.3 | M | V | ½ |
| | Spare half octet | Spare half octet 9.5 | M | V | ½ |
| | DL NAS TRANSPORT message identity | Message type 9.7 | M | V | 1 |
| | Payload container type | Payload container type 9.11.3.40 | M | V | ½ |
| | Spare half octet | Spare half octet 9.5 | M | V | ½ |
| | Payload container | Payload container 9.11.3.39 | M | LV-E | 3-65537 |
| 12 | PDU session ID | PDU session identity 2 9.11.3.41 | C | TV | 2 |

TABLE 3-continued

DL NAS TRANSPORT message

| IEI | Information Element | Type/Reference | Presence | Format | Length |
|---|---|---|---|---|---|
| 24 | Additional information | Additional information 9.11.2.1 | O | TLV | 3-n |
| 58 | 5GMM cause | 5GMM cause 9.11.3.2 | O | TV | 2 |
| 37 | Back-off timer value multiple SM cause with back-off timer value | GPRS timer 3 9.11.2.5 | O | TLV | 3 |

The UE having received the DL NAS TRANSPORT message may back off until the back-off timer included in the DL NAS TRANSPORT message expires.

Thereafter, as the back-off timer expires, in operation 331, the UE 100 may retransmit the SESSION ESTABLISHMENT REQUEST message to the SMF 300 to retry to establish the PDU session. Meanwhile, the UE 100 may identify a forwardable session and an non-forwardable session by checking a multiple SM cause included in the DL NAS TRANSPORT message.

In operation 331, the UE 100 may retransmit the PDU SESSION ESTABLISHMENT REQUEST message to the SMF 300. The UE 100 according to an embodiment may retransmit the PDU SESSION ESTABLISHMENT REQUEST message to the SMF 300 through the AMF 200 with respect to a session that is determined, by checking the multiple SM cause included in the DL NAS TRANSPORT message, to have failed to be forwarded.

Alternatively, according to an embodiment, the UE 100 may transmit the PDU SESSION ESTABLISHMENT REQUEST message to the SMF 300 through the AMF 200 with respect to only a session that may be successfully forwarded, other than the session that is determined, by checking the multiple SM cause included in the DL NAS TRANSPORT message, to have failed to be forwarded.

Figure 3B:
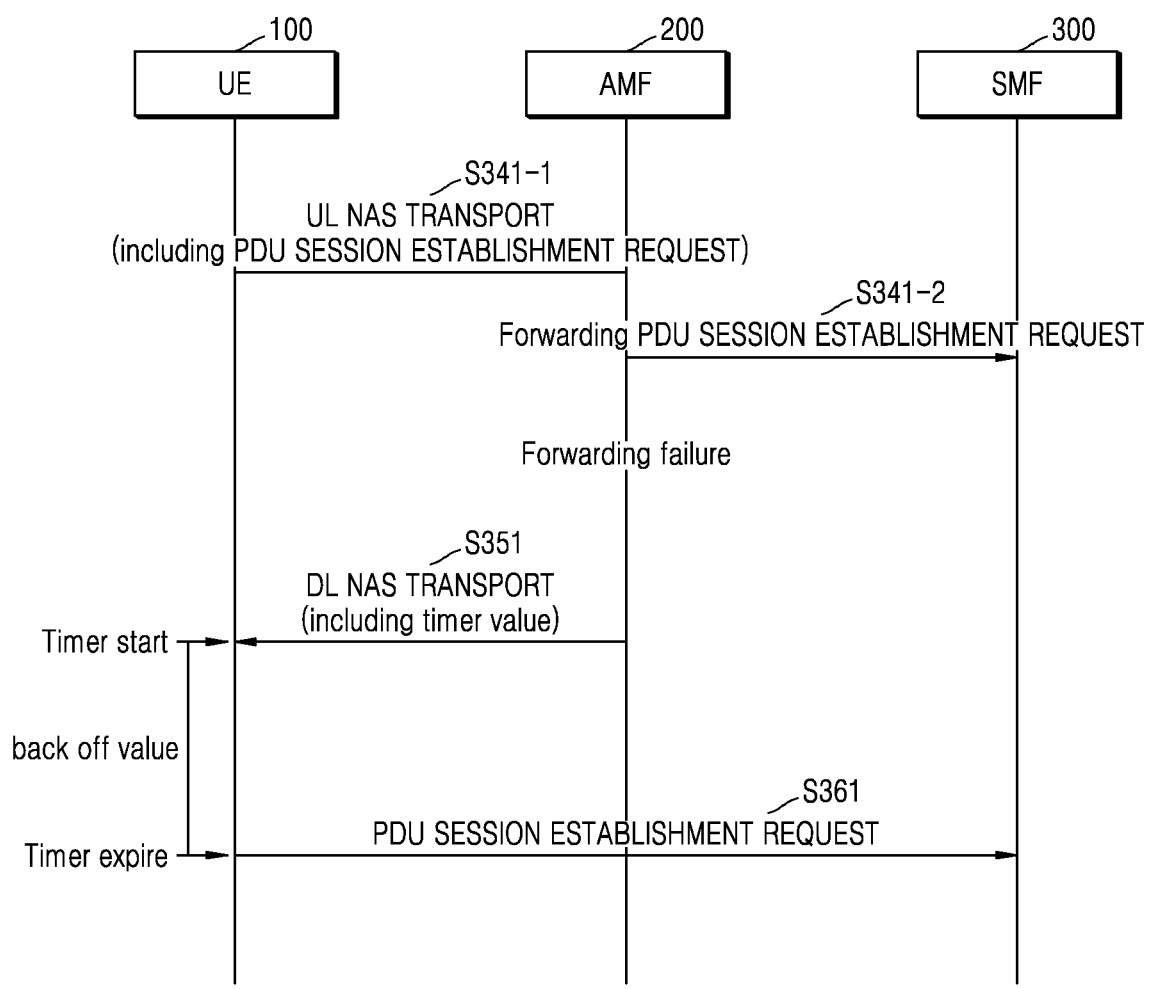
FIG. 3B is a flowchart for describing in more detail a method of performing session management based on a back-off timer value included in a NAS message in a 5G network environment, according to an embodiment of the present disclosure.

FIG. 3B is a flowchart for describing in more detail a method of performing session management based on a back-off timer value included in a NAS message in a 5G network environment, according to an embodiment of the present disclosure.

In operation 341-1, the UE 100 may transmit a UL NAS TRANSPORT message including a PDU SESSION ESTABLISHMENT REQUEST message to the AMF 200.

In operation 341-2, the AMF 200 needs to forward the PDU SESSION ESTABLISHMENT REQUEST message to the SMF 300, but the PDU SESSION ESTABLISHMENT REQUEST message may fail to be forwarded to the SMF 300 for various reasons, for example, because the AMF 200 is unable to find an appropriate SMF. In such a case in which the forwarding has failed, operation 341-2 is not performed.

In operation 351, the AMF 200 may transmit a DL NAS TRANSPORT message to the UE 100 as the forwarding of the PDU SESSION ESTABLISHMENT REQUEST message has failed. The AMF 200 may transmit the DL NAS TRANSPORT message to inform the UE 100 that the PDU SESSION ESTABLISHMENT REQUEST message has not been forwarded.

In addition, the AMF 200 according to an embodiment may set a timer in the DL NAS TRANSPORT message to be transmitted to the UE 100. The set timer may be a back-off timer that expires at a time point at which the PDU SESSION ESTABLISHMENT REQUEST message is retransmitted.

In addition, when a multiple-session management message is not transmitted or some of session management messages are not transmitted, the DL NAS TRANSPORT message may include cause information in order to inform of a cause of the untransmitted message(s). Such cause information may be coded with a single information element 'Multiple SM cause' as illustrated in FIG. 4. According to another embodiment, the cause information may be coded together with a back-off timer as illustrated in FIG. 5 and coded into multiple SM cause with back-off timer value as shown in Table 3.

The UE 100 having received the DL NAS TRANSPORT message may back off until the back-off timer included in the DL NAS TRANSPORT message expires.

Thereafter, as the back-off timer expires, in operation 331, the UE 100 may retransmit the SESSION ESTABLISHMENT REQUEST message to the SMF 300 to retry to establish the PDU session. Meanwhile, the UE 100 may identify a session that has not failed to be forwarded and a session that has failed to be forwarded, by checking the multiple SM cause included in the DL NAS TRANSPORT message.

In operation 361, the UE 100 may transmit the PDU SESSION ESTABLISHMENT REQUEST message to the SMF 300. The UE 100 according to an embodiment may retransmit the PDU SESSION ESTABLISHMENT REQUEST message to the SMF 300 through the AMF 200 with respect to a session that is determined, by checking the multiple SM cause included in the DL NAS TRANSPORT message, to have failed to be forwarded.

Alternatively, according to an embodiment, the UE 100 may transmit the PDU SESSION ESTABLISHMENT REQUEST message to the SMF 300 through the AMF 200 with respect to only a session that may be successfully forwarded, other than the session that is determined, by checking the multiple SM cause included in the DL NAS TRANSPORT message, to have failed to be forwarded.

FIG. 4 is a diagram for describing cause information included in a DL NAS TRANSPORT message, according to an embodiment of the present disclosure. Referring to FIG. 4, reasons for failures in forwarding of a plurality of sessions may be coded into a single information element 'Multiple SM cause'.

FIG. 5 is a diagram for describing cause information included in a DL NAS TRANSPORT message, according to another embodiment of the present disclosure. Referring to FIG. 5, reasons for failures in forwarding of a plurality of sessions may be coded together with values of a back-off timer.

Meanwhile, FIGS. 4 and 5 are merely examples, and the structure of a cause IE included in a DL NAS TRANSPORT message is not limited thereto.

Figure 6A:
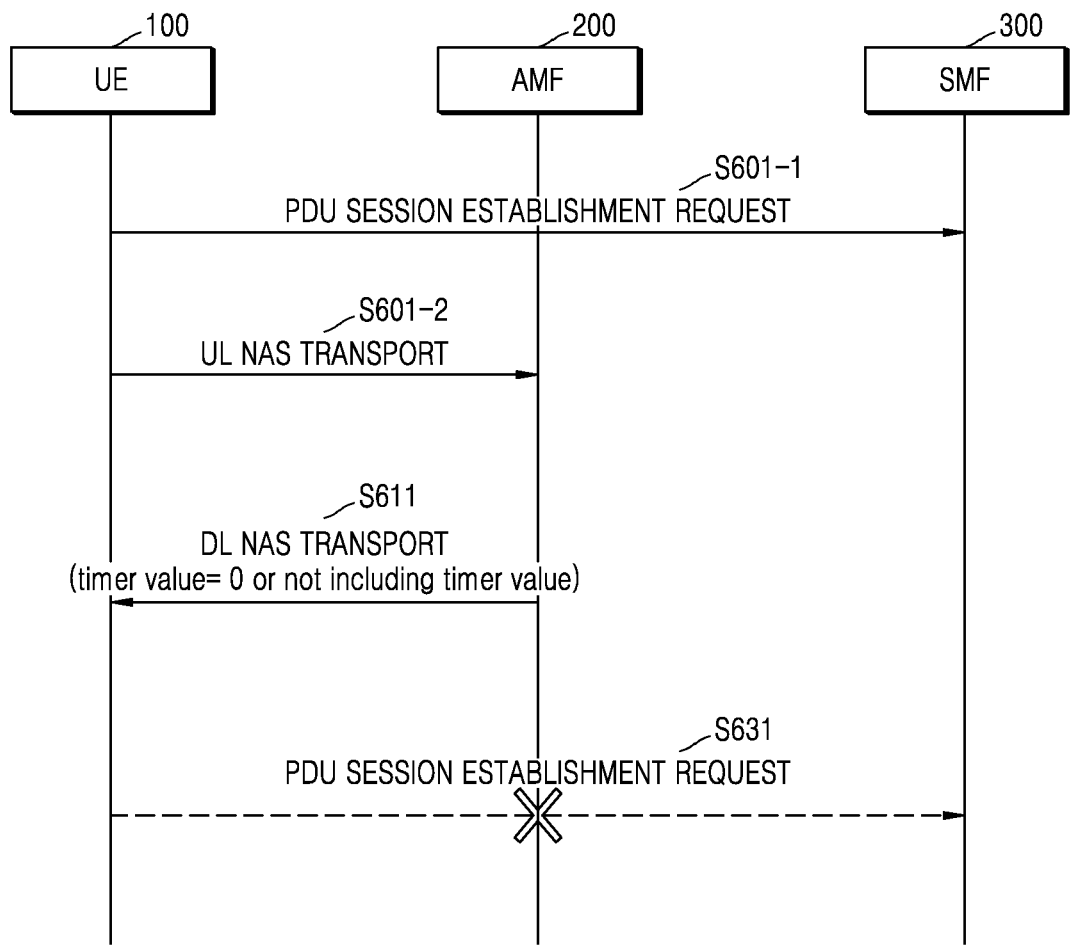
FIG. 6A is a flowchart for describing a method of performing session management based on a back-off timer value included in a NAS message in a 5G network environment, according to another embodiment of the present disclosure.

FIG. 6A is a flowchart for describing a method of performing session management based on a back-off timer value included in a NAS message in a 5G network environment, according to another embodiment of the present disclosure.

In operation 601-1, the UE 100 may transmit a PDU SESSION ESTABLISHMENT REQUEST message to the SMF 300. The PDU SESSION ESTABLISHMENT REQUEST message of operation 401-1 passing through a section between the UE 100 and the AMF 200 is carried in a UL NAS TRANSPORT message as in operation 401-2 (may be included therein and transmitted).

At this time, the PDU SESSION ESTABLISHMENT REQUEST message may be carried (included) in the UL NAS TRANSPORT message and transmitted to the AMF 200 as in operation 201-2, but may then fail to be forwarded to the SMF 300 for various reasons, for example, because the AMF 200 is unable to find an appropriate SMF.

In this case, as in operation 611, the AMF 200 according to an embodiment transmits a DL NAS TRANSPORT message to the UE 100 to notify that the corresponding message has failed to be forwarded.

In operation 601-2, the UE 100 may transmit the UL NAS TRANSPORT message to the AMF 200.

In operation 611, the AMF 200 may transmit the DL NAS TRANSPORT message to the UE 100. According to an embodiment, the AMF 200 may not set a timer in the DL NAS TRANSPORT message to be transmitted to the UE 100. In addition, according to another example, the AMF 200 may set the value of a timer to 0 in the DL NAS TRANSPORT message to be transmitted to the UE 100.

TABLE 4

DL NAS TRANSPORT message

| IEI | Information Element | Type/Reference | Presence | Format | Length |
|---|---|---|---|---|---|
| | Extended protocol discriminator | Extended protocol discriminator 9.2 | M | V | 1 |
| | Security header type | Security header type 9.3 | M | V | 1/2 |
| | Spare half octet | Spare half octet 9.5 | M | V | 1/2 |
| | DL NAS TRANSPORT message identity | Message type 9.7 | M | V | 1 |
| | Payload container type | Payload container type 9.11.3.40 | M | V | 1/2 |
| | Spare half octet | Spare half octet 9.5 | M | V | 1/2 |
| | Payload container | Payload container 9.11.3.39 | M | LV-E | 3-65537 |
| 12 | PDU session ID | PDU session identity 2 9.11.3.41 | C | TV | 2 |
| 24 | Additional information | Additional information 9.11.2.1 | O | TLV | 3-n |
| 58 | 5GMM cause | 5GMM cause 9.11.3.2 | O | TV | 2 |
| 37 | Back-off timer value | GPRS timer 3 9.11.2.5 | O | TLV | 3 | may include IEs listed in Table 5 below, and may include, for example, a The UE 100 according to an embodiment does not retry to establish the PDU session when the timer value included in the DL NAS TRANSPORT message is 0 or no timer value is included in the DL NAS TRANSPORT message.

Figure 6B:
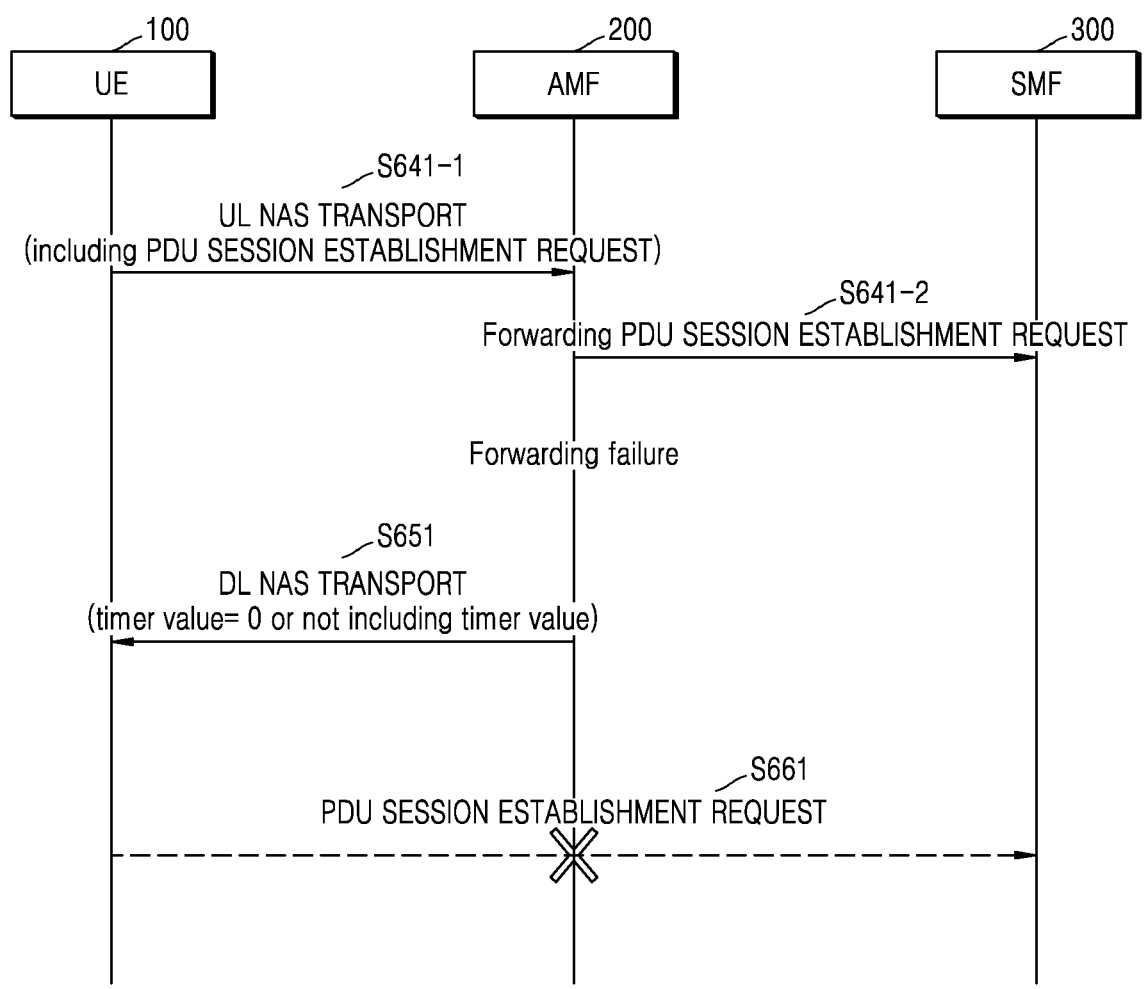
FIG. 6B is a flowchart for describing in more detail a method of performing session management based on a back-off timer value included in a NAS message in a 5G network environment, according to another embodiment of the present disclosure.

FIG. 6B is a flowchart for describing in more detail a method of performing session management based on a back-off timer value included in a NAS message in a 5G network environment, according to another embodiment of the present disclosure.

In operation 641-1, the UE 100 may transmit a UL NAS TRANSPORT message including a PDU SESSION ESTABLISHMENT REQUEST message to the AMF 200.

In operation 641-2, the AMF 200 needs to forward the PDU SESSION ESTABLISHMENT REQUEST message to the SMF 300, but the PDU SESSION ESTABLISHMENT REQUEST message may fail to be forwarded to the SMF 300 for various reasons, for example, because the AMF 200 is unable to find an appropriate SMF.

In operation 651, the AMF 200 may transmit the DL NAS TRANSPORT message to the UE 100. According to an embodiment, the AMF 200 may not set a timer in the DL NAS TRANSPORT message to be transmitted to the UE 100. In addition, according to another example, the AMF 200 may set the value of a timer to 0 in the DL NAS TRANSPORT message to be transmitted to the UE 100.

The UE 100 according to an embodiment does not retry to establish the PDU session when the timer value included in the DL NAS TRANSPORT message is 0 or no timer value is included in the DL NAS TRANSPORT message.

Figure 7:
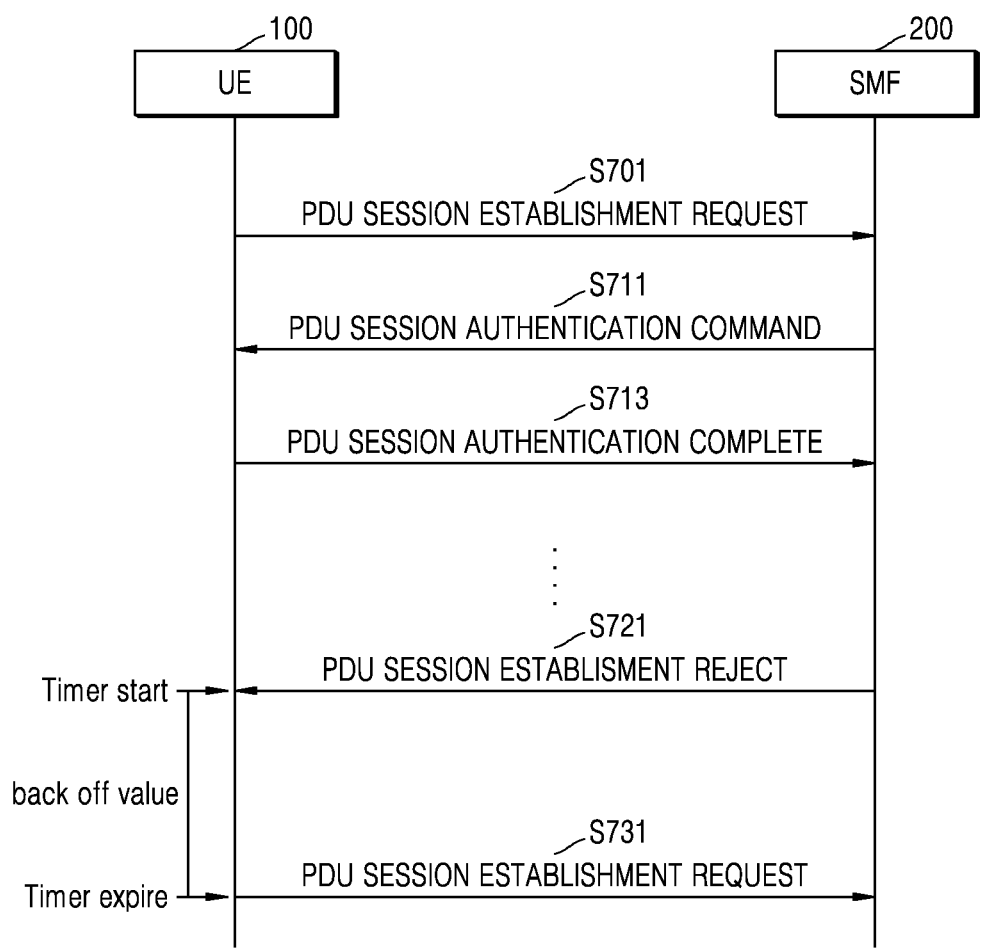
FIG. 7 is a flowchart for describing an operation according to a back-off timer value included in a packet data unit (PDU) session establishment reject message in authentication of a session in a 5G network environment, according to an embodiment of the present disclosure.

FIG. 7 is a flowchart for describing an operation according to a back-off timer value included in a PDU session establishment reject message in authentication of a session in a 5G network environment, according to an embodiment of the present disclosure.

In operation 701, the UE 100 may transmit a PDU SESSION ESTABLISHMENT REQUEST message to the SMF 200. The PDU SESSION ESTABLISHMENT REQUEST message may be transmitted from the UE 100 to the SMF 200 to request establishment of a PDU session.

In operation 711, the SMF 200 may transmit a PDU SESSION AUTHENTICATION COMMAND message to the UE 100. The SMF 200 may include a PDU session authentication process as a partial process of PDU session establishment according to a request by the UE 100. Accordingly, the SMF may transmit a PDU SESSION AUTHENTICATION COMMAND message to the UE 100 to authenticate the PDU session.

In operation 713, the UE 100 may transmit a PDU SESSION AUTHENTICATION COMPLETE message to the SMF 200.

In operation 721, the SMF 200 may transmit a PDU SESSION ESTABLISHMENT REJECT message to the UE. When it is determined that PDU session authentication is invalid (when the PDU session authentication fails), the SMF 200 may transmit the PDU SESSION ESTABLISHMENT REJECT message to the UE 100. The PDU SESSION ESTABLISHMENT REJECT message according to an embodiment back-off timer value.

TABLE 5

PDU SESSION ESTABLISHMENT REJECT message

| IEI | Information Element | Type/Reference | Presence | Format | Length |
|---|---|---|---|---|---|
| | Extended protocol discriminator | Extended protocol discriminator 9.2 | M | V | 1 |
| | PDU session ID | PDU session identity 9.4 | M | V | 1 |

TABLE 5-continued

PDU SESSION ESTABLISHMENT REJECT message

| IEI | Information Element | Type/Reference | Presence | Format | Length |
|---|---|---|---|---|---|
| | PTI | Procedure transaction identity 9.6 | M | V | 1 |
| | PDU SESSION ESTABLISHMENT REJECT message identity | Message type 9.7 | M | V | 1 |
| | 5GSM cause | 5GSM cause 9.11.4.2 | M | V | 1 |
| 37 | Back-off timer value | GPRS timer 3 9.11.2.5 | O | TLV | 3 |
| F- | Allowed SSC mode | Allowed SSC mode 9.11.4.5 | O | TV | 1 |
| 78 | EAP message | EAP message 9.11.2.2 | O | TLV-E | 7-1503 |
| 7B | Extended protocol configuration options | Extended protocol configuration options 9.11.4.6 | O | TLV-E | 4-65538 |
| TBD | Re-attempt indicator | Re-attempt indicator 9.11.4.17 | O | TLV | 3 |
| 61 | 5GSM congestion re-attempt indicator | 5GSM congestion re-attempt indicator 9.11.4.21 | O | TLV | 3 |

In operation 731, the UE 100 may transmit the PDU SESSION ESTABLISHMENT REQUEST message to the SMF 200. When a back-off timer value is included in the received PDU SESSION ESTABLISHMENT REJECT message, the UE 100 may transmit the PDU SESSION ESTABLISHMENT REQUEST message to the SMF 200 after backing off for the back-off timer value. Meanwhile, in this case, the UE 100 may also transmit the PDU SESSION ESTABLISHMENT REQUEST message to an equivalent public land mobile network (EPLMN). The EPLMN corresponds to a PLMN recognized to be the same as or equivalent to the PLMN in which the UE 100 is currently located, and the UE 100 may transmit the PDU SESSION ESTABLISHMENT REQUEST message to the EPLMN selected based on a stored EPLMN list.

Figure 8:
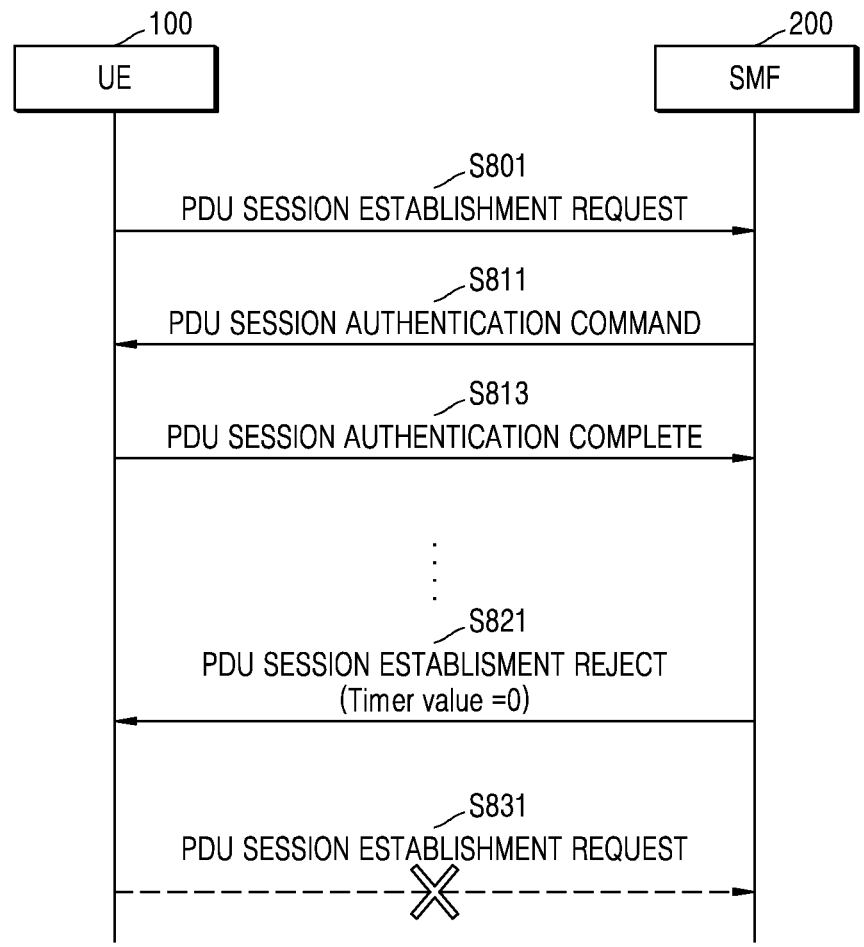
FIG. 8 is a flowchart for describing an operation according to a back-off timer value included in a PDU session establishment reject message in authentication of a session in a 5G network environment, according to another embodiment of the present disclosure.

FIG. 8 is a flowchart for describing an operation according to a back-off timer value included in a PDU session establishment reject message in authentication of a session in a 5G network environment, according to another embodiment of the present disclosure.

In operation 801, the UE 100 may transmit a PDU SESSION ESTABLISHMENT REQUEST message to the SMF 200. The PDU SESSION ESTABLISHMENT REQUEST message may be transmitted from the UE 100 to the SMF 200 to request establishment of a PDU session.

In operation 811, the SMF 200 may transmit a PDU SESSION AUTHENTICATION COMMAND message to the UE 100. The SMF 200 may transmit the PDU SESSION AUTHENTICATION COMMAND message to the UE 100 to authenticate the PDU session.

In operation 813, the UE 100 may transmit a PDU SESSION AUTHENTICATION COMPLETE message to the SMF 200.

In operation 821, the SMF 200 may transmit a PDU SESSION ESTABLISHMENT REJECT message to the UE 100. When it is determined that PDU session authentication is invalid (when the PDU session authentication fails), the SMF 200 may transmit the PDU SESSION ESTABLISHMENT REJECT message to the UE. The PDU SESSION ESTABLISHMENT REJECT message according to an embodiment may include IEs listed in Table 6 below. In addition, according to an embodiment, a back-off timer value included in the PDU SESSION ESTABLISHMENT REJECT message may be set to 0.

TABLE 6

PDU SESSION ESTABLISHMENT REJECT message

| IEI | Information Element | Type/Reference | Presence | Format | Length |
|---|---|---|---|---|---|
| | Extended protocol discriminator | Extended protocol discriminator 9.2 | M | V | 1 |
| | PDU session ID | PDU session identity 9.4 | M | V | 1 |
| | PTI | Procedure transaction identity 9.6 | M | V | 1 |
| | PDU SESSION ESTABLISHMENT REJECT message identity | Message type 9.7 | M | V | 1 |
| | 5GSM cause | 5GSM cause 9.11.4.2 | M | V | 1 |
| 37 | Back-off timer value | GPRS timer 3 9.11.2.5 | O | TLV | 3 |

TABLE 6-continued

PDU SESSION ESTABLISHMENT REJECT message

| IEI | Information Element | Type/Reference | Presence | Format | Length |
|---|---|---|---|---|---|
| F- | Allowed SSC mode | Allowed SSC mode 9.11.4.5 | O | TV | 1 |
| 78 | EAP message | EAP message 9.11.2.2 | O | TLV-E | 7-1503 |
| 7B | Extended protocol configuration options | Extended protocol configuration options 9.11.4.6 | O | TLV-E | 4-65538 |
| TBD | Re-attempt indicator | Re-attempt indicator 9.11.4.17 | O | TLV | 3 |
| 61 | 5GSM congestion re-attempt indicator | 5GSM congestion re-attempt indicator 9.11.4.21 | O | TLV | 3 |

In operation 831, the UE 100 may determine that authentication of the PDU session has failed, and thus may not retry to transmit the PDU SESSION ESTABLISHMENT REQUEST message. That is, the UE 100 may determine that the authentication of the PDU session has failed upon receiving the PDU SESSION ESTABLISHMENT REJECT message from the SMF 200. In this case, the UE 100 may determine whether to retry to request establishment of the PDU session based on the back-off value included in the PDU SESSION ESTABLISHMENT REJECT message. For example, the UE 100 may not retry to request establishment of the PDU session when the back-off value included in the SESSION ESTABLISHMENT REJECT message is 0. However, this is merely an example, and the back-off value upon which the UE 100 does not retry request establishment of the PDU session is not limited to the above-described example.

Figure 9A:
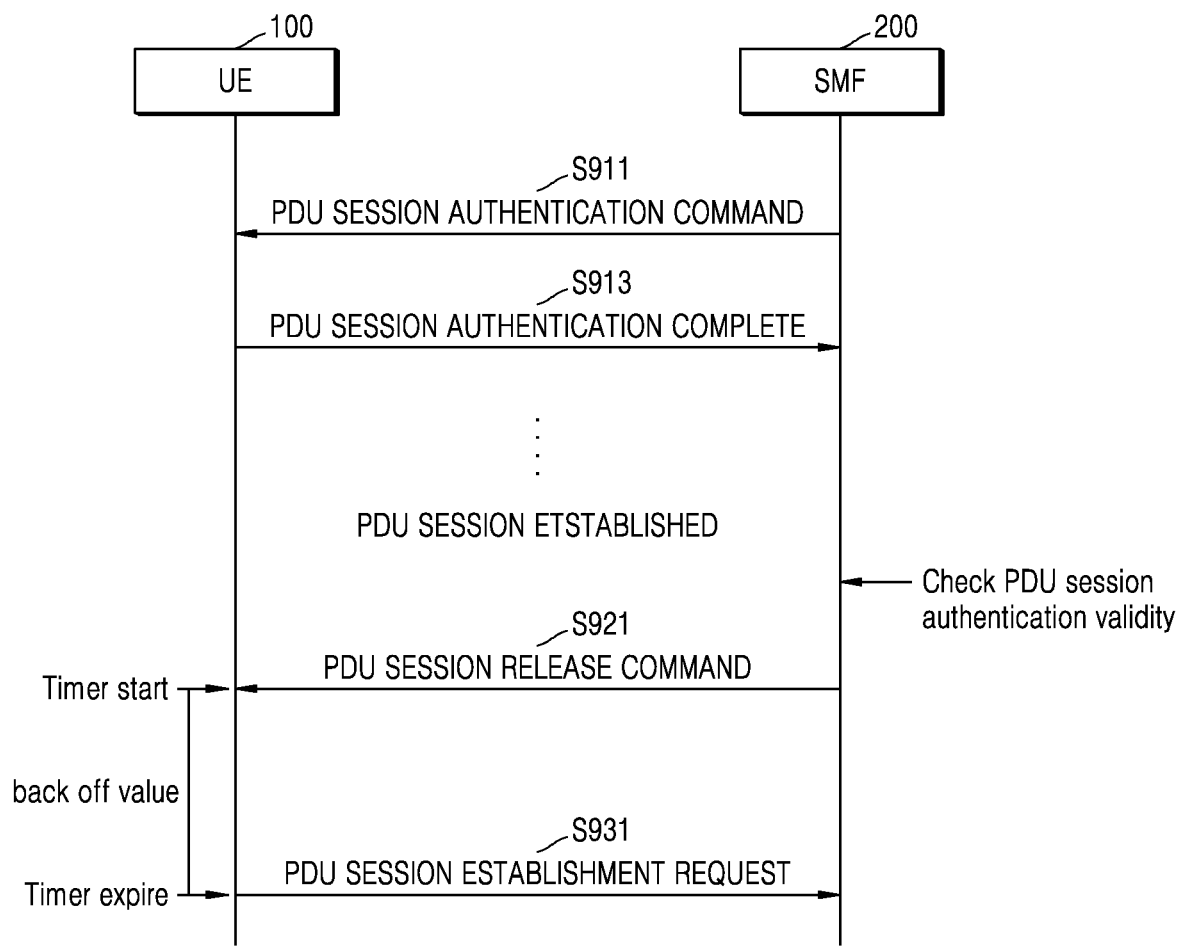
FIG. 9A is a flowchart for describing an operation according to a back-off timer value included in a PDU session establishment release message in authentication of a session in a 5G network environment, according to an embodiment of the present disclosure.

FIG. 9A is a flowchart for describing an operation according to a back-off timer value included in a PDU session establishment release message in authentication of a session in a 5G network environment, according to an embodiment of the present disclosure.

In operation 911, the SMF 200 may transmit a PDU SESSION AUTHENTICATION COMMAND message to the UE 100. The SMF 200 may transmit the PDU SESSION AUTHENTICATION COMMAND message to the UE 100 to authenticate the PDU session.

In operation 913, the UE 100 may transmit a PDU SESSION AUTHENTICATION COMPLETE message to the SMF 200.

In operation 921, the SMF 200 may transmit a PDU SESSION RELEASE COMMAND message to the UE 100. The SMF 200 may perform an authentication process on the PDU session through a PDU session authentication command even after establishment of the PDU session with the UE 100 is completed. In this case, when it is determined that the PDU session authentication is invalid (when the PDU session authentication process has failed), the SMF 200 may transmit the PDU SESSION RELEASE COMMAND message to the UE 100.

In this case, the PDU SESSION RELEASE COMMAND message may include IEs listed in Table 7 below. For example, the PDU SESSION RELEASE COMMAND message may include a back-off timer value.

TABLE 7

PDU SESSION RELEASE COMMAND MESSAGE

| IEI | Information Element | Type/Reference | Presence | Format | Length |
|---|---|---|---|---|---|
|  | Extended protocol discriminator | Extended protocol discriminator 9.2 | M | V | 1 |
|  | PDU session ID | PDU session identity 9.4 | M | V | 1 |
|  | PTI | Procedure transaction identity 9.6 | M | V | 1 |
|  | PDU SESSION RELEASE COMMAND message identity | Message type 9.7 | M | V | 1 |
|  | 5GSM cause | 5GSM cause 9.11.4.2 | M | V | 1 |
| 37 | Back-off timer value | GPRS timer 3 9.11.2.5 | O | TLV | 3 |
| 78 | EAP message | EAP message 9.11.2.2 | O | TLV-E | 7-1503 |
| 61 | 5GSM congestion re-attempt indicator | 5GSM congestion re-attempt indicator 9.11.4.21 | O | TLV | 3 |
| 7B | Extended protocol configuration options | Extended protocol configuration options 9.11.4.6 | O | TLV-E | 4-65538 |

In operation 931, the UE 100 may transmit a PDU SESSION ESTABLISHMENT REQUEST message to the SW' 200. When a back-off timer value is included in the received PDU SESSION RELEASE COMMAND message, the UE 100 may transmit the PDU SESSION ESTABLISHMENT REQUEST message to the SW' 200 after backing off for the back-off timer value. In this case, the UE 100 may back off for the set back-off timer value and then transmit the PDU SESSION ESTABLISHMENT REQUEST message to the SMF 200.

Meanwhile, in this case, the UE 100 may also transmit the PDU SESSION ESTABLISHMENT REQUEST message to an EPLMN. The EPLMN corresponds to a PLMN recognized to be the same as or equivalent to the PLMN in which the UE 100 is currently located, and the UE 100 may transmit the PDU SESSION ESTABLISHMENT REQUEST message to the EPLMN selected based on a stored EPLMN list.

Figure 9B:
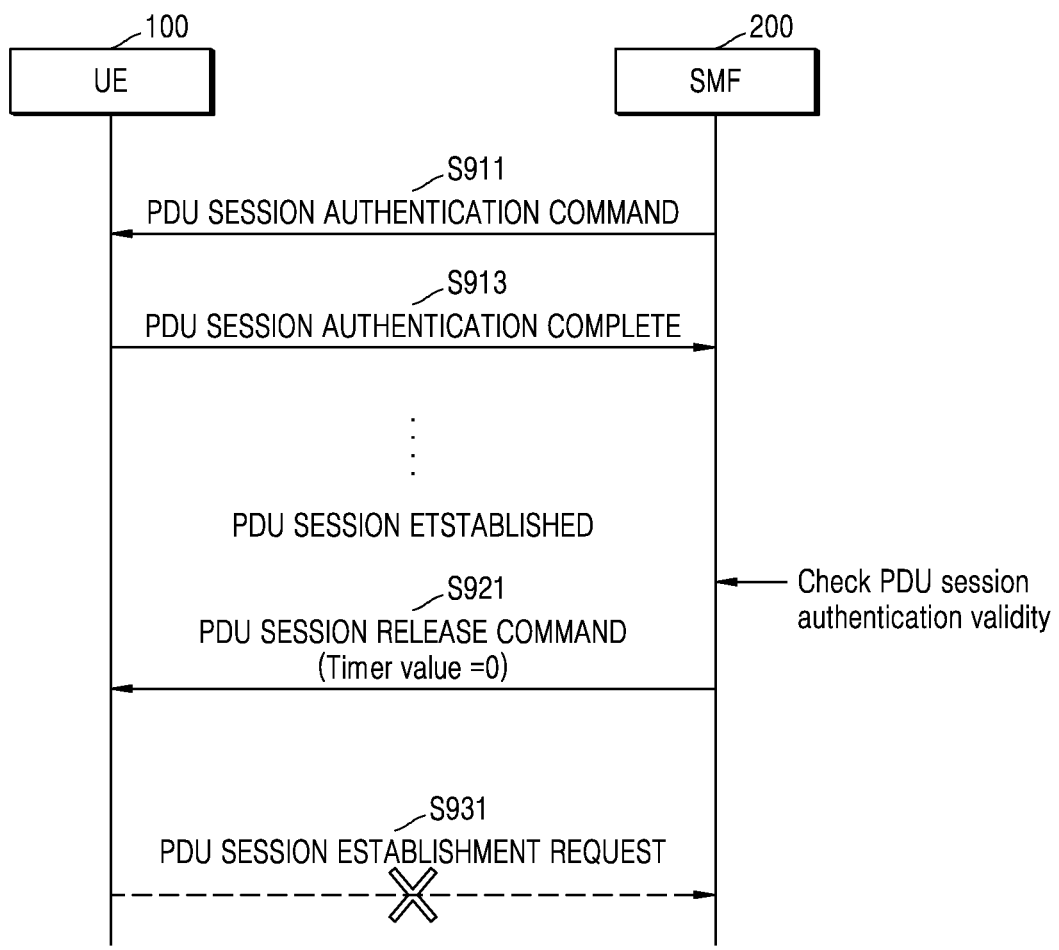
FIG. 9B is a flowchart for describing an operation according to a back-off timer value included in a PDU session establishment release message in authentication of a session in a 5G network environment, according to another embodiment of the present disclosure.

FIG. 9B is a flowchart for describing an operation according to a back-off timer value included in a PDU session establishment release message in authentication of a session in a 5G network environment, according to another embodiment of the present disclosure.

In operation 911, the SMF 200 may transmit a PDU SESSION AUTHENTICATION COMMAND message to the UE 100. The SMF 200 may transmit the PDU SESSION AUTHENTICATION COMMAND message to the UE 100 to authenticate the PDU session.

In operation 913, the UE 100 may transmit a PDU SESSION AUTHENTICATION COMPLETE message to the SMF 200.

In operation 921, the SMF 200 may transmit a PDU SESSION RELEASE COMMAND message to the UE 100. Even after the PDU session establishment with the UE 100 is completed, the SMF 200 may transmit a PDU session authentication command to the UE to perform PDU session authentication. In this case, when it is determined that the PDU session authentication is invalid (when the PDU session authentication process has failed), the SMF 200 may transmit the PDU SESSION RELEASE COMMAND message to the UE 100.

In this case, the PDU SESSION RELEASE COMMAND message may include the IEs listed in Table 7 described above. For example, the PDU SESSION RELEASE COMMAND message may include a back-off timer value set to 0.

In operation 931, the UE 100 may determine that authentication of the PDU session has failed, and thus may not retry to transmit the PDU SESSION ESTABLISHMENT REQUEST message. The UE 100 may determine that the authentication of the PDU session has failed upon receiving a PDU SESSION ESTABLISHMENT RELEASE message from the SMF 200. In this case, the UE 100 may determine whether to retry to request establishment of the PDU session based on the back-off value included in the PDU SESSION ESTABLISHMENT RELEASE message. For example, the UE 100 may not retry to request establishment of the PDU session when the back-off value included in the SESSION ESTABLISHMENT RELEASE message is 0. However, this is merely an example, and the back-off value upon which the UE 100 does not retry to request establishment of the PDU session is not limited to the above-described example.

Figure 10A:
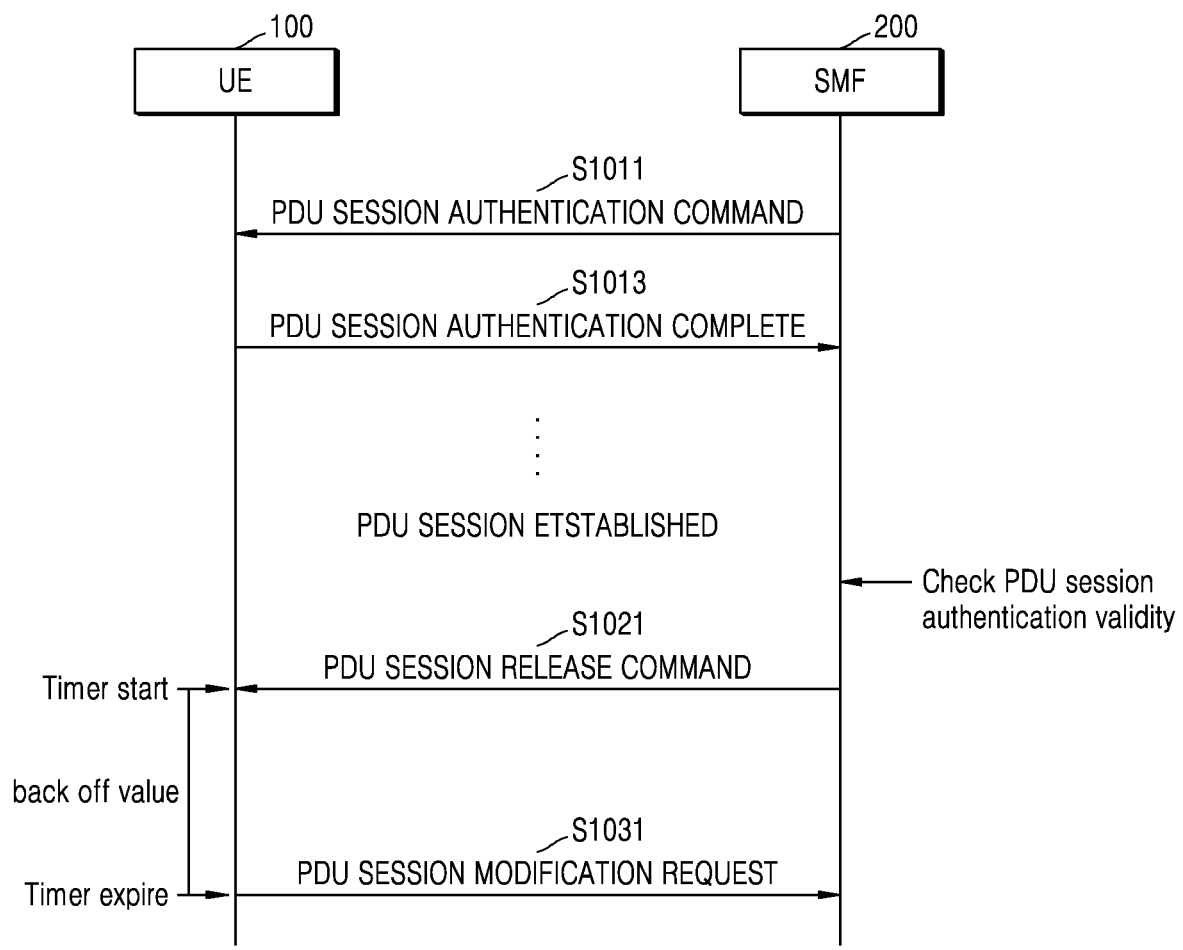
FIG. 10A is a flowchart for describing an operation according to a back-off timer value included in a PDU session establishment release message in authentication of a session in a 5G network environment, according to another embodiment of the present disclosure.

FIG. 10A is a flowchart for describing an operation according to a back-off timer value included in a PDU session establishment release message in authentication of a session in a 5G network environment, according to another embodiment of the present disclosure.

In operation 1011, the SMF 200 may transmit a PDU SESSION AUTHENTICATION COMMAND message to the UE 100. The SMF 200 may transmit the PDU SESSION AUTHENTICATION COMMAND message to the UE 100 to authenticate the PDU session.

In operation 1013, the UE 100 may transmit a PDU SESSION AUTHENTICATION COMPLETE message to the SMF 200.

In operation 1021, the SMF 200 may transmit a PDU SESSION RELEASE COMMAND message to the UE 100. Even after the PDU session establishment with the UE 100 is completed, the SMF 200 may transmit the PDU SESSION RELEASE COMMAND message to the UE to perform a PUD session authentication process. In this case, when it is determined that the PDU session authentication is invalid (when the PDU session authentication process has failed), the SMF 200 may transmit the PDU SESSION RELEASE COMMAND message to the UE 100.

In this case, the PDU SESSION RELEASE COMMAND message may include IEs listed in Table 8 below. For example, the PDU SESSION RELEASE COMMAND message may include a back-off timer value.

TABLE 8

| | | PDU SESSION RELEASE COMMAND MESSAGE | | | |
|---|---|---|---|---|---|
| IEI | Information Element | Type/Reference | Presence | Format | Length |
| | Extended protocol discriminator | Extended protocol discriminator 9.2 | M | V | 1 |
| | PDU session ID | PDU session identity 9.4 | M | V | 1 |
| | PTI | Procedure transaction identity 9.6 | M | V | 1 |
| | PDU SESSION RELEASE COMMAND message identity | Message type 9.7 | M | V | 1 |
| | 5GSM cause | 5GSM cause 9.11.4.2 | M | V | 1 |
| 37 | Back-off timer value | GPRS timer 3 9.11.2.5 | O | TLV | 3 |
| 78 | EAP message | EAP message 9.11.2.2 | O | TLV-E | 7-1503 |
| 61 | 5GSM congestion re-attempt indicator | 5GSM congestion re-attempt indicator 9.11.4.21 | O | TLV | 3 |

TABLE 8-continued

PDU SESSION RELEASE COMMAND MESSAGE

| IEI | Information Element | Type/Reference | Presence | Format | Length |
|---|---|---|---|---|---|
| 7B | Extended protocol configuration options | Extended protocol configuration options 9.11.4.6 | O | TLV-E | 4-65538 |

In operation 1031, the UE 100 may transmit a PDU SESSION MODIFICATION REQUEST message to the SMF 200. When a back-off timer value is included in the received PDU SESSION RELEASE COMMAND message, the UE 100 may transmit the PDU SESSION MODIFICATION REQUEST message to the SMF 200 after backing off for the back-off timer value. In this case, the UE 100 may back off for the set back-off timer value and then transmit the PDU SESSION MODIFICATION REQUEST message to the SMF 200.

Meanwhile, in this case, the UE 100 may also transmit the PDU SESSION MODIFICATION REQUEST message to an EPLMN. The EPLMN corresponds to a PLMN recognized to be the same as or equivalent to the PLMN in which the UE 100 is currently located, and the UE 100 may transmit the PDU SESSION MODIFICATION REQUEST message to the EPLMN selected based on a stored EPLMN list.

Figure 10B:
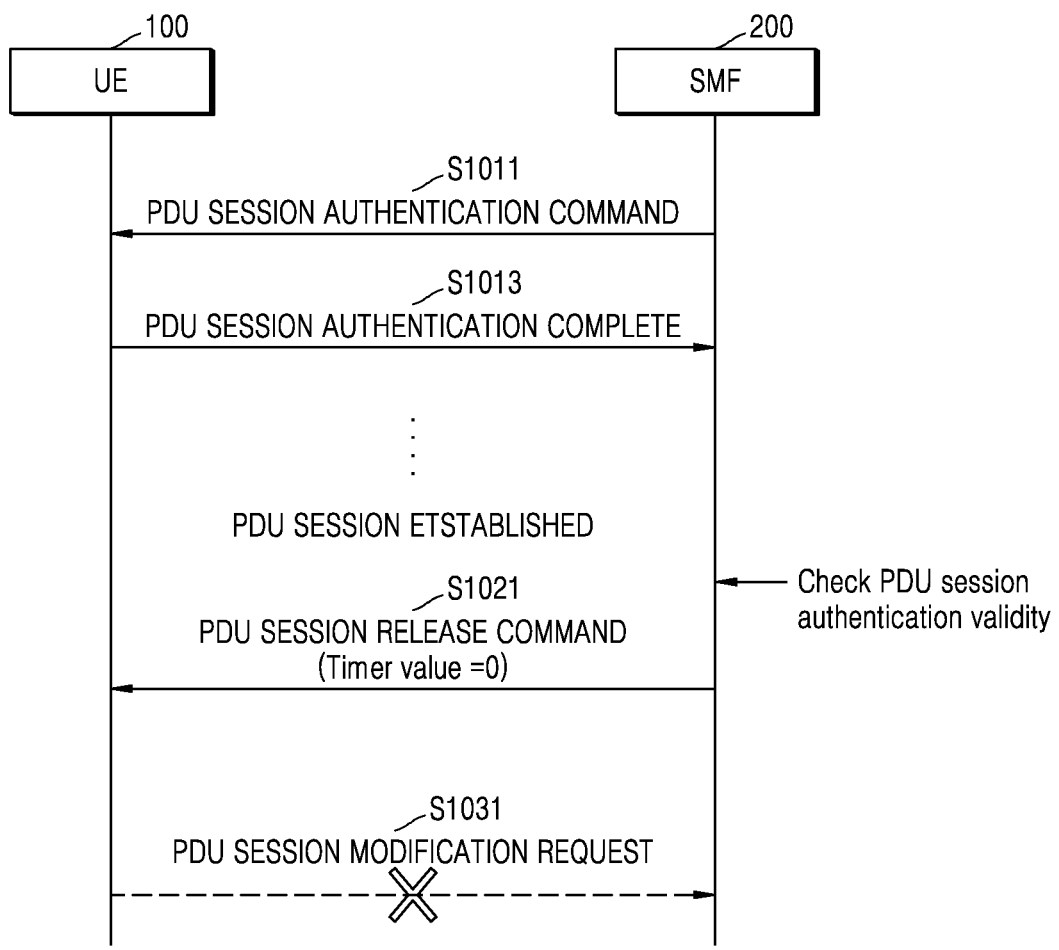
FIG. 10B is a flowchart for describing an operation according to a back-off timer value included in a PDU session establishment release message in authentication of a session in a 5G network environment, according to another embodiment of the present disclosure.

FIG. 10B is a flowchart for describing an operation according to a back-off timer value included in a PDU session establishment release message in authentication of a session in a 5G network environment, according to another embodiment of the present disclosure.

In operation 1011, the SMF 200 may transmit a PDU SESSION AUTHENTICATION COMMAND message to the UE 100. The SMF 200 may transmit the PDU SESSION AUTHENTICATION COMMAND message to the UE 100 to authenticate the PDU session.

In operation 1013, the UE 100 may transmit a PDU SESSION AUTHENTICATION COMPLETE message to the SMF 200.

In operation 1021, the SMF 200 may transmit a PDU SESSION RELEASE COMMAND message to the UE 100. Even after the PDU session establishment with the UE 100 is completed, the SMF 200 may transmit the PDU SESSION RELEASE COMMAND message to the UE to perform a PUD session authentication process. In this case, when it is determined that the PDU session authentication is invalid (when the authentication process on the PDU session has failed), the SMF 200 may transmit the PDU SESSION RELEASE COMMAND message to the UE 100.

In this case, the PDU SESSION RELEASE COMMAND message may include the IEs listed in Table 4 described above. For example, the PDU SESSION RELEASE COMMAND message may include a back-off timer value set to 0.

In operation 1031, the UE 100 may determine that authentication of the PDU session has failed, and thus may not retry to transmit the PDU SESSION MODIFICATION REQUEST message. The UE 100 may determine that the authentication of the PDU session has failed upon receiving a PDU SESSION RELEASE message from the SMF 200. In this case, the UE 100 may determine whether to retry to request PDU session modification based on the back-off value included in the PDU SESSION RELEASE message. For example, the UE 100 may not retry to request PDU session modification when the back-off value included in the PDU SESSION RELEASE message is 0. However, this is merely an example, and the back-off value upon which the UE 100 does not retry to request modification of the PDU session is not limited to the above-described example.

Figure 11:
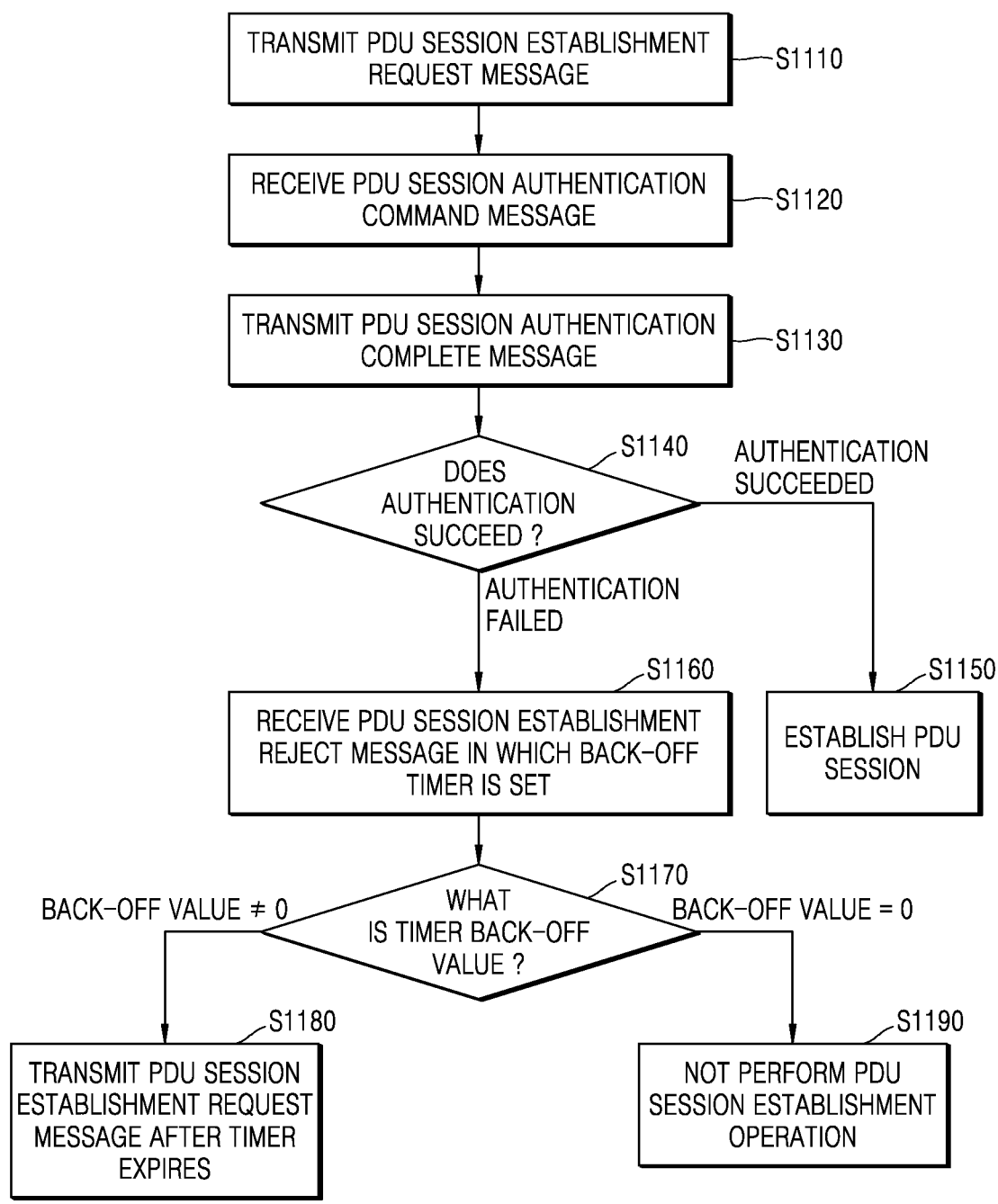
FIG. 11 is a flowchart for describing operations of a user equipment (UE) and a session management function (SMF) in authentication of a PDU session, according to an embodiment.

FIG. 11 is a flowchart for describing operations of a UE and an SMF in authentication of a PDU session, according to an embodiment.

In operation 1110, the UE may transmit a PDU session establishment request message to the SMF. The PDU session establishment request message may be transmitted from the UE to the SMF to request establishment of the PDU session.

In operation 1120, the UE may receive a PDU session authentication command message from the SMF. The SMF may include a PDU session authentication process as a partial process of a PDU session establishment process according to the request of the UE, and may transmit the PDU session authentication command message to the UE to authenticate the PDU session.

In operation 1130, the UE may transmit a PDU session authentication complete message to the SMF.

In operation 1140, the SMF may determine whether the PDU session authentication is valid (whether the authentication succeeded or failed).

In operation 1150, when it is determined that the PDU session authentication is valid (when the PDU session authentication succeeded), a PDU session establishment process may be performed between the UE and the SMF, or a previously established PDU session may be maintained.

In operation 1160, the UE may receive, from the SMF, a PDU session establishment reject message in which a back-off timer is set. The UE may receive, from the SMF, the PDU session establishment reject message in which the back-off timer is set.

In operation 1170, the UE may check a value of the back-off timer included in the PDU session establishment reject message.

In operation 1180, when the value of the back-off timer is not 0, the UE may retransmit the PDU session establishment request message after the back-off timer expires.

When the value of the back-off timer is 0, in operation 1190, the UE may not perform an operation of retrying to establish the PDU session.

For example, when the UE receives the PDU session establishment reject message, the UE may start a timer based on a back-off timer included in the PDU session establishment reject message. In this case, as described above, when the value of the back-off timer is not 0, the UE may cause the timer to expire after the value of the back-off timer, and then transmit the PDU session establishment request message to attempt PDU session establishment. On the other hand, when the value of the back-off timer included in the PDU session reject message is 0, the UE may not try to establish the PDU session. For example, when PDU session establishment fails and is impossible, an operation, performed by the UE, of transmitting a PDU session request message after receiving a PDU session reject message may be unnecessary. In consideration of the above, the SMF may instruct the UE not to perform a PDU session establishment operation. In this case, for example, the SMF may transmit, to the UE, a PDU session reject message in which the value of a back-off timer is set to 0. In this case, the UE may not try to establish the PDU session when the value of the back-off timer is 0. That is, the value of the back-off timer set to 0 may be used as an indicator that disables a PDU session establishment attempt operation from being performed. Through this, the UE may be controlled not to perform an unnecessary operation.

Meanwhile, although FIG. 11 illustrates that the UE receives the PDU session establishment reject message, this is merely an example, and the UE may receive a PDU session establishment release message as described above with reference to FIGS. 9A, 9B, 10A, and 10B.

That is, the value of a back-off timer in a PUD session establishment release message may also be set to 0 or a value other than 0. In this case, for example, when the value of a back-off timer of a PDU session establishment release message is 0, the UE may not transmit a PDU session establishment request message and may not perform a PUD session establishment operation. In addition, for example, when the value of a back-off timer in a PDU establishment release message is 0, the UE may not transmit a PDU session modification request message and may not perform a PUD modification operation.

Furthermore, for example, when the value of a back-off timer in a PDU session establishment release message is not 0, the UE may operate based on an operation of the back-off timer as described above.

Figure 12:
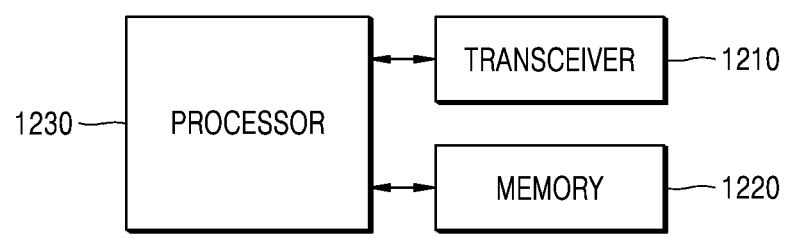
FIG. 12 is a diagram illustrating a configuration of a UE according to an embodiment of the present disclosure.

FIG. 12 is a diagram illustrating a configuration of a UE according to an embodiment of the present disclosure.

As illustrated in FIG. 12, the UE of the present disclosure may include a transceiver 1210, a memory 1220, and a processor 1230. The processor 1230, the transceiver 1210, and the memory 1220 of the UE may operate according to the above-described communication method of a UE. However, the components of the UE are not limited to the above-described examples. For example, the UE may include more or fewer components than the above-described components. Furthermore, the processor 1230, the transceiver 1210, and the memory 1220 may be implemented as a single chip.

The transceiver 1210 collectively refers to a receiver and a transmitter of the UE, and may transmit and receive a signal to and from a base station or a network entity. The signal transmitted and received to and from the base station may include control information and data. To this end, the transceiver 1210 may include a radio frequency (RF) transmitter for up-converting and amplifying a frequency of a signal being transmitted, and an RF receiver for low-noise-amplifying a received signal and down-converting a frequency of the received signal. However, this is merely an example of the transceiver 1210, the components of which are not limited to the RF transmitter and the RF receiver.

In addition, the transceiver 1210 may include a wired/wireless transceiver, and may include various components for transmitting and receiving signals.

Also, the transceiver 1210 may receive a signal through a radio channel, output the signal to the processor 1230, and transmit a signal output from the processor 1230 through a radio channel.

Also, the transceiver 1210 may receive a communication signal, output the communication signal to the processor, and transmit a signal output from the processor to a network entity through a wired/wireless network.

The memory 1220 may store a program and data necessary for the operation of the UE. In addition, the memory 1220 may store control information or data included in a signal obtained by the UE. The memory 1220 may be implemented as a storage medium such as read-only memory (ROM), random-access memory (RAM), a hard disk, a compact disc-ROM (CD-ROM), or a digital versatile disc (DVD), or a combination thereof.

The processor 1230 may control a series of operations to allow the UE to operate according to the above-described embodiments of the present disclosure. The processor 1230 may include one or more processors. For example, the processor 1230 may include a communication processor (CP) for performing control for communication and an application processor (AP) for controlling a higher layer such as an application program.

Figure 13:
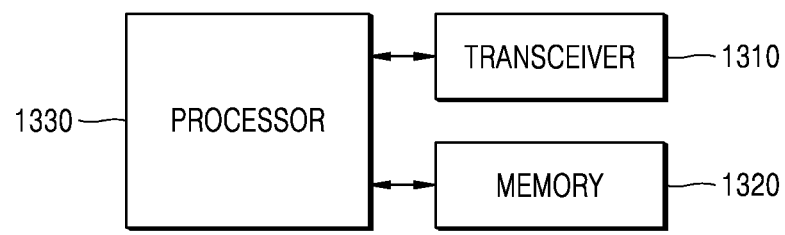
FIG. 13 is a diagram illustrating a configuration of a network entity according to an embodiment of the present disclosure.

FIG. 13 is a diagram illustrating a configuration of a network entity according to an embodiment of the present disclosure.

As illustrated in FIG. 13, the network entity of the present disclosure may include a transceiver 1310, a memory 1320, and a processor 1330. The processor 1330, the transceiver 1310, and the memory 1320 of the network entity may operate according to the communication method of a network entity described above. However, the components of the network entity are not limited to the above-described examples. For example, the network entity may include more or fewer components than the above-described components. Furthermore, the processor 1330, the transceiver 1310, and the memory 1320 may be implemented as a single chip. The network entity may include NFs such as an AMF and an SMF described above.

The transceiver 1210 collectively refers to a receiver and a transmitter of the network entity, and may transmit and receive a signal to and from a UE or another network entity. Here, the transmitted or received signal may include control information and data. To this end, the transceiver 1310 may include an RF transmitter for up-converting and amplifying a frequency of a signal being transmitted, and an RF receiver for low-noise-amplifying a received signal and down-converting a frequency of the received signal. However, this is merely an example of the transceiver 1310, the components of which are not limited to the RF transmitter and the RF receiver. The transceiver 1310 may include a wired/wireless transceiver, and may include various components for transmitting and receiving signals.

Also, the transceiver 1310 may receive a signal through a communication channel (e.g., a radio channel), output the signal to the processor 1330, and transmit a signal output from the processor 1330 through a communication channel.

Also, the transceiver 1310 may receive a communication signal, output the communication signal to the processor, and transmit a signal output from the processor to a UE or a network entity through a wired/wireless network.

The memory 1320 may store a program and data necessary for the operation of the network entity. In addition, the memory 1320 may store control information or data included in a signal obtained by the network entity. The memory 1320 may be implemented as a storage medium such as ROM, RAM, a hard disk, a CD-ROM, or a DVD, or a combination thereof.

The processor 1330 may control a series of operations to allow the network entity to operate according to the above-described embodiments of the present disclosure. The processor 1330 may include one or more processors. Methods according to claims or embodiments described in the specification of the present disclosure may be implemented in hardware, software, or a combination of hardware and software.

When implemented in software, a computer-readable storage medium storing one or more programs (software modules) may be provided. The one or more programs stored in the computer-readable storage medium are configured for execution by one or more processors in an electronic device. The one or more programs include instructions that cause the electronic device to execute the methods according to the embodiments described in claims or the specification of the present disclosure.

The programs (e.g., software modules or software) may be stored in non-volatile memory including RAM or flash memory, ROM, electrically erasable programmable ROM (EEPROM), a magnetic disc storage device, a CD-ROM, a DVD or other optical storage device, or a magnetic cassette. Alternatively, the programs may be stored in memory including a combination of some or all of the above-mentioned storage media. In addition, a plurality of such memory units may be included.

Also, the programs may be stored in an attachable storage device accessible through any or a combination of communication networks such as the Internet, an intranet, a local area network (LAN), a wide LAN (WLAN), or a storage area network (SAN). The storage device may access, via an external port, a device for performing an embodiment of the present disclosure. In addition, a separate storage device on a communication network may access the device for performing an embodiment of the present disclosure.

In the embodiments of the present disclosure described above, the elements included in the present disclosure have been expressed in the singular or plural form according to the suggested embodiments of the present disclosure. However, the expression in the singular or plural form is appropriately selected according to the suggested situations for convenience of explanation and is not intended to limit the present disclosure to the single or plural elements, and even when a certain element is expressed in the plural form, it may be provided with a single element, and even when a certain element is expressed in the singular form, it may be provided with a plurality of elements.

Although certain embodiments have been described in the detailed description of the present disclosure, various modifications may be made without departing from the scope of the present disclosure. Therefore, the scope of the present disclosure should not be limited to the above-described embodiments of the present disclosure and should be determined by the appended claims and the equivalents thereof.

The invention claimed is:

1. A method, performed by a user equipment (UE), of managing a session in a wireless communication system, the method comprising:
transmitting, to an access and mobility management function (AMF), a first uplink (UL) non-access stratum (NAS) transport message including a packet data unit (PDU) session establishment request;
receiving a downlink (DL) NAS transport message from the AMF; and
transmitting, based on a value of a back-off timer included in the DL NAS transport message, a second UL NAS transport message including the PDU session establishment request,
wherein the DL NAS transport message includes information about a cause of a failure in forwarding of the PDU session establishment request that has not been forwarded, among a plurality of PDU session establishment requests for which forwarding from the AMF to a session management function (SMF) has been attempted.

2. The method of claim 1, wherein the transmitting of the second UL NAS transport message includes transmitting, in case that the back-off timer expires, the second UL NAS transport message including the PDU session establishment request.

3. The method of claim 1, wherein the information about the cause of the failure in the forwarding is included in the DL NAS transport message as an information element (IE) separate from the value of the back-off timer, or is included in the DL NAS transport message as one IE together with the value of the back-off timer.

4. A user equipment (UE) for managing a session in a wireless communication system, the UE comprising:
a transceiver; and
at least one processor coupled with the transceiver, wherein the at least one processor is configured to control the transceiver to:
transmit, to an access and mobility management function (AMF), a first uplink (UL) non-access stratum (NAS) transport message including a packet data unit (PDU) session establishment request,
receive a downlink (DL) NAS transport message from the AMF, and
transmit, based on a value of a back-off timer included in the DL NAS transport message, a second UL NAS transport message including the PDU session establishment request,
wherein the DL NAS transport message includes information about a cause of a failure in forwarding of the PDU session establishment request that has not been forwarded, among a plurality of PDU session establishment requests for which forwarding from the AMF to a session management function (SMF) has been attempted.

5. The UE of claim 4, wherein the at least one processor is further configured to control the transceiver to transmit, in case that the back-off timer expires, the second UL NAS transport message including the PDU session establishment request.

6. The UE of claim 4, wherein the information about the cause of the failure in the forwarding is included in the DL NAS transport message as an information element (IE) separate from the value of the back-off timer, or is included in the DL NAS transport message as one IE together with the value of the back-off timer.

7. A network entity for managing a session in a wireless communication system, the network entity comprising:
a transceiver; and
at least one processor coupled with the transceiver, wherein the at least one processor is configured to:
control the transceiver to receive, from a user equipment (UE), a first uplink (UL) non-access stratum (NAS) transport message including a packet data unit (PDU) session establishment request,
determine whether forwarding of the PDU session establishment request to a session management function (SMF) is successful,
control the transceiver to transmit, to the UE, a downlink (DL) NAS transport message including a value of a back-off timer that is set based on that the forwarding is not successful, and
control the transceiver to receive, from the UE, a second UL NAS transport message including the PDU session establishment request based on the value of the back-off timer included in the DL NAS transport message, wherein the DL NAS transport message includes information about a cause of a failure in forwarding of the PDU session establishment request that has not been forwarded, among a plurality of PDU session establishment requests for which forwarding from the network entity to the SMF has been attempted.

8. The network entity of claim 7, wherein the at least one processor is further configured to control the transceiver to receive, in case that the back-off timer expires, the second UL NAS transport message including the PDU session establishment request.

9. The network entity of claim 7, wherein the information about the cause of the failure in the forwarding is included in the DL NAS transport message as an information element (IE) separate from the value of the back-off timer, or is included in the DL NAS transport message as one IE together with the value of the back-off timer.

* * * * *